United States Patent
Tsurushima et al.

(10) Patent No.: US 6,659,167 B2
(45) Date of Patent: Dec. 9, 2003

(54) DOOR MECHANISM OF AUTOMOTIVE AIR CONDITIONING DEVICE

(75) Inventors: Akihiro Tsurushima, Tochigi (JP); Toshiyuki Yoshida, Saitama (JP); Masaharu Onda, Tochigi (JP); Toshiya Uchida, Novi, MI (US); Katsuaki Koshida, Tochigi (JP); Katsuhiro Kurokawa, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/874,295

(22) Filed: Jun. 6, 2001

(65) Prior Publication Data

US 2001/0027861 A1 Oct. 11, 2001

Related U.S. Application Data

(62) Division of application No. 09/297,271, filed on Apr. 28, 1999, now Pat. No. 6,305,462.

(30) Foreign Application Priority Data

| Feb. 6, 1997 | (JP) | 9-24030 |
| Mar. 7, 1997 | (JP) | 9-53697 |
| Sep. 29, 1997 | (JP) | 9-264043 |
| Nov. 14, 1997 | (JP) | 9-313830 |
| Feb. 6, 1998 | (WO) | PCT/JP98/00506 |

(51) Int. Cl.[7] .......................... F25B 29/00; B60H 1/00; B60H 3/00; B60H 1/32
(52) U.S. Cl. .......................... 165/43; 165/42; 165/103; 165/201; 454/156; 454/160; 454/161; 454/121; 454/126; 237/12.3 A; 237/12.3 B; 137/875
(58) Field of Search .......................... 165/42, 43, 103, 165/201; 454/156, 121, 160, 161, 126; 251/180, 182; 237/12.3 A, 12.3 B; 137/875

(56) References Cited

U.S. PATENT DOCUMENTS 4,541,296 A * 9/1985 Oyafuso .................... 74/425

(List continued on next page.)

FOREIGN PATENT DOCUMENTS

| JP | 56-154309 | * 11/1981 |
| JP | 57-87709 | * 6/1982 |
| JP | 59-124721 | 8/1984 |
| JP | 61-87711 | 6/1986 |
| JP | 2-15508 | 1/1990 |
| JP | 2-72110 | 6/1990 |
| JP | 3-88808 | 9/1991 |
| JP | 5-13811 | 2/1993 |
| JP | 5-69731 | 3/1993 |
| JP | 07-172144 | * 7/1995 |
| JP | 7-315035 | * 12/1995 |
| JP | 8-290714 | 11/1996 |
| JP | 09-123748 | 5/1997 |

*Primary Examiner*—John K. Ford
(74) *Attorney, Agent, or Firm*—Foley & Lardner

(57) ABSTRACT

A mix door (5) is arranged in air passages (10, 11) of an automotive air conditioning device. The mix door (5) is arranged to extend in a direction to shut an air flow blown from the upstream air passage (10) and swelled in a downstream direction with a predetermined radius of curvature. The door (5) is guided by arcuate cam grooves (19) and driven upward and downward to achieve open/close operation with the aid of a sliding mechanism (M). Compact construction, reduction in air flow resistance, smoothed handling, high sealing and high temperature controlling are achieved.

4 Claims, 13 Drawing Sheets

U.S. PATENT DOCUMENTS

| | | | |
|---|---|---|---|
| 4,546,617 A | 10/1985 | Suzuki et al. | 165/43 |
| 4,664,551 A | 5/1987 | Poitier | |
| 4,794,537 A * | 12/1988 | Adasek et al. | 237/5 |
| 4,898,325 A * | 2/1990 | Sakurada | 165/43 |
| 5,009,392 A | 4/1991 | Ostrand | 454/121 |
| 5,062,352 A | 11/1991 | Ostrand | 454/121 |
| 5,062,473 A | 11/1991 | Ostrand et al. | 165/43 |
| 5,080,140 A | 1/1992 | Ostrand et al. | 137/875 |
| 5,154,223 A * | 10/1992 | Ishimaru et al. | 165/42 |
| 5,228,475 A | 7/1993 | Trill | |
| 5,372,065 A * | 12/1994 | Cuozzo et al. | 101/93 |
| 5,701,949 A * | 12/1997 | Yamaguchi et al. | 165/42 |
| 5,881,558 A | 3/1999 | Kawahira et al. | 454/156 |
| 5,899,806 A | 5/1999 | Hase et al. | 454/156 |
| 6,305,462 B1 * | 10/2001 | Tsurushima et al. | 165/43 |

* cited by examiner

DOOR MECHANISM OF AUTOMOTIVE AIR CONDITIONING DEVICE

The present application is a divisional of application Ser. No. 09/297,271, filed Apr. 28, 1999, now U.S. Pat. No. 6,305,462, issued Oct. 23, 2001.

TECHNICAL FIELD

The present invention relates to a door mechanism of an automotive air conditioning device, which can slide in a limited space to smoothly control an air flow.

TECHNICAL BACKGROUND

In general, an automotive air conditioning device comprises an intake unit for introducing outside and inside air, a cooler unit for cooling the introduced air and a heater unit for heating the introduced air, these three units being combined in series and installed in a limited space of a vehicle cabin, such as a space defined below an instrument panel.

However, due to the in-line connection of the three units, the automotive air conditioning device is compelled to have an enlarged size. Thus, when such device is mounted in a small car, the smaller vehicle cabin space is further limited, which is undesirable.

In view of the above, as is shown in FIG. 16, there has been proposed a device in which a cooler unit 101 and a heater unit 102 are positioned close to each other and aligned along a fore-and-aft direction of the vehicle thereby to reduce not only a longitudinal size "L" of the vehicle but also a lateral size of the same. Furthermore, in this device, for reduction of size, the distance between an evaporator 103 and a heater core 104 is reduced and a mix door (which will be referred to as just "door" hereinafter) 105 for producing cooler and/or warmer air is reduced in size.

As is known, the evaporator 103 is a device through which a low temperature low pressure refrigerant, which flows in a refrigerating cycle, flows for producing a cooled air by conducting a heat exchange between the refrigerant and an induced air. While, the heater core 104 is a device through which a highly heated engine cooling water flows for producing a heated air by conducting a heat exchange between the cooling water and an induced air.

However, in the unit having the above-mentioned construction, the reduction in size of the door 105 tends to cause a difficulty with which distribution of cooled air and warmed air is controlled. Thus, in some devices, as is illustrated by a broken line in the drawing, an auxiliary door 105a is provided for controlling the amount of air led to the heater core 104. However, in this case, the addition of such auxiliary door causes a complicated and highly expensive construction, which is of course undesirable.

However, in the unit having the above-mentioned construction, the reduction in size of the door 105 tends to cause a difficulty with which distribution of cooled air and warmed air is controlled. Thus, in some devices, as is illustrated by a broken line in the drawing, an auxiliary door 105a is provided for controlling the amount of air led to the heater core 104. However, in this case, the addition of such auxiliary door causes a complicated and highly costing construction, which is of course undesirable.

Accordingly, recently, there has been proposed, as is shown in FIG. 17, a much compact automotive air conditioning device (see Japanese Utility Model Provisional Publication 6-71222).

In the device, for achieving the compact construction, a cooler unit 101 and a heater unit 102 are integrated, and an evaporator 103 and a heater core 104 are positioned close to each other. That is, since, like in case of the mix door 105 arranged between the evaporator 103 and the heater core 104 and supported at one fulcrum as shown in FIG. 17, turning the door 106 about the fulcrum needs a relatively larger mounting, a flat plate door 109 (the door shown in the drawing comprises two doors 109a and 109b which are connected through pins "pa" and "pb" to a door actuating mechanism comprised of a link mechanism) is employed, the flat plate door being slid up-and-down along a rail 109c for effecting the temperature control.

However, a door mechanism possessed by the above-mentioned vertically sliding type tends to have a higher resistance against air passage and thus tends to show weak points in operability. That is, since the above-mentioned door 109 disclosed by the publication is of a flat and straight type, the air flow is forced to collide against the door at right angles, which brings about a higher air flow resistance causing reduction in air flow. When this air flow reduction occurs under a cooling condition of the air conditioner, the passengers can not get a satisfactorily cooled air.

In order to prevent air leakage around the door 109, it is necessary to remove or minimize a clearance provided between the rail 109c and the door 109. However, if the clearance is too small, the sliding resistance of the door becomes increased causing a non-smoothed movement of the door 109. This undesired phenomenon equally occurs even when a sealing member is arranged between the door 109 and the rail 109c. While, if, for achieving a smoothed movement of the door, a larger clearance is provided between them, the undesired air leakage tends to occur. That is, in this case, antinomic matters take place.

Furthermore, in a case wherein, like the door 9 of the above-mentioned publication, the sliding mechanism is composed of a link mechanism, the connection between the pin and the link tends to produce a play upon operation of the door. When the door is applied with a certain wind pressure, noises caused by the play tend to be produced, which are transmitted to the vehicle cabin to make passengers uncomfortable.

The present invention is provided for eliminating the above-mentioned drawbacks possessed by the conventional techniques. That is, a first object of the invention is to provide an excellent door mechanism of an automotive air conditioning device, which assures a compact construction of the unit, reduction in air flow resistance, smoothed operation, satisfied sealing and satisfied air temperature controlling without producing noises.

Furthermore, as is seen from FIG. 16, in general, in a heater unit, around a mixing chamber 111, there are arranged a defroster opening 106a, a ventilation opening 107a and foot opening 108a. To these openings, there are connected mode doors, such as a defroster door 106 and a ventilation door 107. When one of the mode doors is actuated, the same is projected into the mixing chamber 111. If the mode doors are designed to pivot in a direction away from the mixing chamber 111, the size of the entire construction of unit becomes increased, which is not preferable.

Each time one of the mode doors is actuated, the direction of air flowing in the mixing chamber 111 is forced to change and thus desired and stable mixing between cooled air and warmed air is not obtained. Furthermore, the presence of the mode doors causes a marked increase in air flow resistance and production of noises.

For example, in a ventilation mode, by the function of the mix door 105, part of the cooled air from the evaporator 103 is led into a bypass passage "B" and remaining part of the cooled air is led toward the heater core 104 to be warmed. The cooled air and warmed air are mixed in the mixing chamber 111 for blowing from the ventilation opening 107a an air having a predetermined temperature.

However, when the defroster door 106 takes a position to open the defroster opening 106a, the defroster door 106 is projected into the mixing chamber 111 and thus the flow of the cooled air in the bypass passage "B" is disturbed by the projected defroster door 106, which changes the air distribution region in the mixing chamber 111. Thus, stable mixing between the cooled air and warmed air is not achieved and thus stable air temperature controlling becomes difficult. In view of this drawback, some conventional devices are equipped with a fixed temperature controlling rib in the mixing chamber 111 for obtaining a stable air temperature controlling.

However, in case wherein the air temperature controlling rib is employed, it is difficult to determine the size of the temperature controlling rib and the positioning of the same. Furthermore, due to employment of the temperature controlling rib, the number of parts increases and thus assembling work of the case becomes difficult or at least troublesome, and cost is increased. Furthermore, due to presence of the temperature controlling rib in the mixing chamber 111, the chamber has a non-negligible air flow resistance, which tends to induce that a satisfied amount of air is not fed to the vehicle cabin. Furthermore, even when the air temperature controlling rib is so positioned and sized as to exhibit the best ventilation mode, it often occurs that the air temperature controlling rib has a bad effect on the temperature controlling in the other mode (viz., the mode other than the ventilation mode, wherein the ventilation door 107 is closed and another door is opened).

Although the above-mentioned example is an example applied to the defrosting mode, similar drawbacks tend to appear in case of the ventilation mode and/or the foot mode.

The present invention is provided for eliminating the above-mentioned drawbacks possessed by the conventional techniques. That is, a second object of the present invention is to provide a door mechanism of an automotive air conditioning device, which can exhibit a stable mixing of cooled air and warmed air irrespective of the mode selected, a reduction in air flow resistance, an excellent air temperature controlling and a compact, simple and economical construction.

A further object of the present invention is to provide a unit which is very compact in size due to unemployment of the foot duct.

Apart from the above, an air conditioning device is widely known wherein as a ventilation opening, there is provided, in an upper wall of a case positioned above the mixing chamber, a center ventilation opening, and near right and left side portions of the center ventilation opening, there are provided side ventilation openings, so that in a ventilation mode, the air whose temperature has been suitably adjusted in the mixing chamber is blown out from the center ventilation opening and the side ventilation openings.

However, in the above-mentioned air conditioning device, the side ventilation openings are formed in the right and left side portions of the center ventilation opening, that is, in a limited space positioned above the upper wall of the case. Thus, the center ventilation opening and the side ventilation openings are each obliged to have a reduced area and thus the air flow resistance of them increases thereby reducing the amount of air blown into the vehicle cabin from such openings.

Depending on the type of the associated vehicle, there is an arrangement wherein when the center ventilation opening is fully closed, part of the temperature-controlled air is blown from the side ventilation openings toward door side window panels to defrost the same. Since, in this arrangement, the ventilation door for opening and closing the center ventilation opening is used for controlling the air distribution, tuning of the air flow amount is difficult.

Accordingly, a third object of the present invention is to provide an automotive air conditioning device, which needs not to reduce the open area of the center ventilation opening and that of the side ventilation opening, can increase the amount of temperature-controlled air blown from these openings and can easily control the amount of air in case wherein a mode is so set that the air is constantly leaked from the side ventilation openings.

DISCLOSURE OF THE INVENTION

In order to achieve the first object, the present invention provides an automotive air conditioning device including an upstream air passage through which air flows, two downstream air passages branched from the upstream air passage, a door having a given size and arranged to selectively lead the air flow from the upstream air passage to one of the two downstream air passages and to lead the air flow to both the two downstream air passages at a given distribution ratio, and movement limiting members arranged in upstream and downstream positions of the door to limit the movement of the door, there is provided a door mechanism of the automotive air conditioning device, which is characterized in that the door is arranged to extend in a direction to shut the air flow blown from the upstream air passage, and in that the door is swelled in a downstream direction with a predetermined radius of curvature.

With the characterization, the unit can be made compact. Furthermore, since the air flow from the upstream air passage smoothly impinges against the curved door, the air flow resistance is not increased, the air flow amount is not reduced and the direction changing of the air flow is smoothly made. Accordingly, it never occurs that in the cooling mode the passengers feel a lack of cooling efficiency, and thus optimal air conditioning is enjoyed by the passengers.

In the present invention the door is arranged to slide upward and downward, that is, in a direction of the gravity.

With this characterization, the door is hardly affected by the gravity which is applied to the door in a direction to pull down the same. That is, since the door is swelled in a downstream direction with the predetermined radius of curvature, the door is hardly affected by the gravity. Accordingly, the door can be optimally controlled at will.

In the present invention the door is connected with a slide mechanism to be controlled. The slide mechanism comprises an arcuate cam groove formed in a case which defines therein the air passages, the arcuate cam groove having a predetermined radius of curvature and being swelled in a downstream direction; a toothed portion formed on a door proper; a gear meshed with the toothed portion; a drive device for driving the gear and a guide member possessed by the door proper, the guide member being movable along the cam groove.

With the characterization, because the door proper is driven by a gear type driving device, the door can be smoothly operated. That is, operability of the door is improved and no noise is produced during operation of the door.

In the present invention the door proper comprises a flat outer portion and a swelled inner portion, the flat outer portion having a seal member bonded thereto.

With this characterization, because adequate sealing is achieved by only fixing a sealing member to a part of the door proper, the air conditioning device can be made economically. Furthermore, for achieving the sealing, there is no need of pressing the door proper with a big force. Driving the door proper is carried out with a small driving torque.

In the present invention the air passages are defined in the case which is constructed by coupling two case segments in a face-to-face connecting manner, and a supporting roller arranged at a laterally middle portion of the door proper and resiliently abutting against the door proper is kept put in the case at the time when the two case segments are being coupled.

With the characterization, mounting of the supporting roller is readily achieved. Furthermore, even when the door proper is somewhat deformed under the influence of the heat from the evaporator and the heater core which are positioned near the door proper, and even when the door proper is applied with a marked wind pressure, the deformation of the door proper can be minimized or easily reformed assuring the sliding movement of the door proper. Thus, even the device employs the gear type sliding mechanism, undesired phenomena, such as gear slippage and the like, do not occur and thus smoothed operation is expected.

In the present invention the heater core is arranged in the air passage through which the air passing though the evaporator flows, at a position just downstream of the evaporator, in that the door proper is a mix door which selectively leads the air flow blown into the air passage from the air evaporator to one of a passage for the heater core and a bypass passage bypassing the heater core or leads the air flow to both the two air passages at a predetermined distribution ratio, and the supporting roller is supported by a supporting wall of the heater core which is located at a middle position of the way along which the door proper slides.

As is defined in this invention, when the door proper is used as the mix door, the door is moved to uppermost and lowermost positions and a predetermined middle position. When, in all of these positions, it is needed to support a laterally middle portion of the door proper, a dead space is inevitably produced at a portion where the laterally middle portion of the door proper is supported. However, if the supporting roller is installed in such dead space and supported by a supporting wall of the heater core, the space can be effectively used. Since the mix door is arranged to distribute the air flow to the two downstream air passages, it has to take a middle position. However, even when the mix door takes the middle position, undesired play of the door does not occur and thus a desired control becomes possible.

For achieving the above-mentioned second object, the present invention provides a door mechanism of an automotive air conditioning device including a case, an evaporator installed in the case for cooling air led into the case, a heater core installed in the case at a position downstream of the evaporator, a mix door arranged between the evaporator and the heater core to selectively lead the cooled air from the evaporator to one of a passage for the heater core and a bypass passage bypassing the heater core or lead the cooled air to both the two passages at a predetermined distribution ratio, a mixing chamber for mixing the cooled air and warmed air, a plurality of blowing openings formed in inside walls by which the mixing chamber is defined and a plurality of mode doors for selectively opening and closing the blowing openings, there is provided a door mechanism of the automotive air conditioning device, which is characterized in that at least one of the mode doors is a sliding type door which, with the aid of a sliding mechanism, slides on the along the inside wall or an extension line of the inside wall, and in that the other of the mode doors is so arranged that even when operated, it does not enter the area of the mixing chamber which is defined by the sliding door and the inside walls.

With this characterization, in case wherein one of the mode doors is of a sliding type and used for making the air flow distribution, the space for installing therein the door can be minimized, and thus the case can be constructed compact in size. Furthermore, since the other mode door is suppressed from entering the area of the mixing chamber which is defined by the sliding door and the inside walls, the mixing between the cooled air and the warmed air is stably made improving the mixing. Thus, there is no need of installing a temperature controlling rib in the mixing chamber, which would cause increase in air flow resistance of the mixing chamber. Thus, temperature controlling is effectively made. In the mixing chamber, the mixing area does not change, and in every mode, the impinging angle between the cooled air flow and the warmed air flow is kept constant, and thus, stable mixing and stable air temperature controlling are obtained. Furthermore, due to disuse of the temperature controlling rib and the simplification of the door operating mechanism, advantages in cost are obtained.

In the present invention the inside wall or the extension line of the inside wall has an arcuate cross section.

With this characterization, the air can smoothly flow along the curved inner surface of the inner wall, and thus undesired noises are not produced and air flow resistance is not increased, so that temperature controlling is advantageously carried out. Particularly, in case wherein the mode controlling is made by operating the slide door, the air is forced to flow along the slide door. That is, since the slide door serves as a guide wall for the air flow, the air temperature controlling is much improved.

In the present invention the sliding mechanism comprises a toothed portion formed on a door proper of the mode door, a gear meshed with the toothed portion, a driving device connected to the gear, guide members possessed by the door proper, and cam grooves formed in the case for slidably receiving therein the guide pins, the cam grooves being so constructed and arranged as to allow the door proper to slide on and along a curved surface of the inside wall by which the mixing chamber is partially defined.

With this characterization, due to usage of the gear type sliding mechanism, smoothed door operation, improved door operability and noiseless door operation are obtained. Furthermore, since the door proper is slid along the cam grooves, undesired play of the door proper does not occur even when the door proper is applied with a wind pressure.

In the present invention the automotive air conditioning device is characterized by a ventilation opening formed in an upper wall of a case located above a mixing chamber in which cooled air passing through an evaporator and warmed air passing through a heater core are mixed, a foot passage located behind the mixing chamber at a position near the ventilation opening and communicated with the mixing chamber, a foot opening provided at a lower part of the foot passage, a ventilation door arranged to selectively open and close the ventilation opening, and a sliding mechanism for sliding the ventilation door on and along an upper inner wall of the case between a close position where the door closes the ventilation opening and a rest (or retracted) position where the door does not interfere with the air flow directed toward the foot passage.

In the present invention the automotive air conditioning device is characterized by a defroster opening formed in the upper wall of the case in front of the ventilation opening, a defroster door for selectively opening and closing the defroster opening, a sliding mechanism for sliding the defroster door on and along an inner surface of the upper wall of the case between a close position where the door closes the defroster opening and a rest (or retracted) position defined above the evaporator where the door does not interfere with the airflow.

In the present invention the sliding mechanism comprises a toothed portion formed on a back surface of the sliding door, a driving gear meshed with the toothed portion, guide pins provided on side edges of the sliding door, and cam grooves provided by the case to slidably receiving therein the guide pins, each cam groove having at its terminal end a bent portion for causing, when the sliding door comes to the terminal end, the sliding door to shift toward the upper wall of the case.

In the present invention the driving gear defined earlier herein has in a toothed portion thereof higher teeth, the higher teeth functioning to press the sliding door toward the upper wall of the case when the sliding door comes to the close position.

In the invention of claim 14, the sliding door is equipped with a seal member which, when the sliding door comes to the close position, intimately contacts peripheral edges of the openings to achieve a sealing therebetween.

For achieving the above-mentioned third object, the present invention provides an automotive air conditioning device which is characterized by a center ventilation opening formed in an upper wall of a case located above a mixing chamber in which cooled air passing through an evaporator and warmed air passing through a heater core are mixed, a ventilation door for selectively opening and closing the center ventilation opening, a sliding mechanism for sliding the ventilation door on and along an inner surface of an upper wall of the case between a close position where the door closes the center ventilation opening and a rest (or retracted) position which is defined before or behind the center ventilation opening, a side ventilation opening formed in the side wall of the case at a position corresponding to the rest (or retracted) position of the sliding door which is defined at a front or rear position of the center ventilation opening, and a sub-door possessed by the sliding door, the sub-door selectively opening and closing the side ventilation opening in response to the opening and closing action of the ventilation door to the center ventilation opening.

In the present invention the close position of the sub-door as defined earlier herein is so made as to partially open the side ventilation opening.

According to the present invention the unit can be made compact. Furthermore, since the air flow from the upstream air passage smoothly impinges against the curved door, the air flow resistance is not increased, the air flow amount is not reduced and the direction changing of the air flow is smoothly made. Accordingly, it never occurs that in the cooling mode the passengers feel a lack of cooling efficiency, and thus optimal air conditioning is enjoyed by the passengers.

According to the present invention the door is hardly affected by the gravity which is applied to the door in a direction to pull down the same. That is, since the door is swelled in a downstream direction with the predetermined radius of curvature, the door is hardly affected by the gravity. Accordingly, the door can be optimally controlled at will.

According to the present invention because the door proper is driven by a gear type driving device, the door can be smoothly operated. That is, operability of the door is improved and no noise is produced during operation of the door.

According to the present invention because adequate sealing is achieved by only fixing a sealing member to a part of the door proper, the air conditioning device can be made economically. Furthermore, for achieving the sealing, there is no need of pressing the door proper with a big force. Driving the door proper is carried out with a small driving torque.

According to the present invention mounting of the supporting roller is readily achieved. Furthermore, even when the door proper is somewhat deformed under the influence of the heat from the evaporator and the heater core which are positioned near the door proper, and even when the door proper is applied with a marked wind pressure, the deformation of the door proper can be minimized or easily reformed assuring the sliding movement of the door proper. Thus, even the device employs the gear type sliding mechanism, undesired phenomena, such as gear slippage and the like, do not occur and thus smoothed operation is expected.

According to the present invention when the door proper is used as the mix door, supporting of the supporting roller is achieved without producing a useless space and even when the door proper is set at the middle position, undesired play does not occur.

According to the present invention since the mode door is of a sliding type, the air distribution operation can be made within a smaller space and thus compact construction of the unit is achieved. Furthermore, since the mode door is suppressed from entering the area of the mixing chamber which is defined by the sliding door and the inside walls, the air flow resistance is not increased and the air mixing in the mixing chamber is appropriately made. That is, the air temperature controlling is improved without using the temperature controlling rib. Since the mixing area does not change and in every mode, the impinging angle between the cooled air flow and the warmed air flow is kept constant, stable mixing and stable air temperature controlling are obtained. Furthermore, due to the simplification of the door operating mechanism, advantages in cost are obtained.

According to the present invention the air can smoothly flow along the curved inner surface of the inner wall, and thus undesired noises are not produced and air flow resistance is not increased, so that temperature controlling is advantageously carried out. Particularly, in case wherein the mode controlling is made by operating the slide door, the air is forced to flow along the slide door. That is, since the slide door serves as a guide wall for the air flow, the air temperature controlling is much improved.

According to the present invention due to usage of the gear type sliding mechanism, smoothed door operation, improved door operability and noiseless door operation are obtained. Furthermore, since the door proper is slid along the cam grooves, undesired play of the door proper does not occur even when the door proper is applied with a wind pressure.

According to the present invention since the ventilation door for selectively opening and closing the ventilation opening formed in the upper wall of the case positioned above the mixing chamber is arranged to slide on and along the upper inner wall of the case with the aid of the sliding mechanism, it never occurs that the door enter the mixing chamber to disturb the air flow when taking a position to open the ventilation opening, which would occur in case of a pivotal door. Accordingly, the mixing of the cooled air and the warmed air in the mixing chamber is improved, and the air distribution to the ventilation opening is appropriately achieved. Furthermore, undesired reduction in air flow amount due to increased air flow resistance caused by the ventilation door does not occur.

Furthermore, since the rest (or retracted) position of the ventilation door is so set as not to interfere with the foot passage, the ventilation door does not cause an air flow resistance against the air flow directed toward the foot passage in the dual level mode wherein the temperature-controlled air is blown from both the ventilation opening and the foot opening. Accordingly, the air amount blown from the foot opening is not reduced, which permits an appropriate operation of the dual level mode.

Furthermore, since the foot passage is defined behind the mixing chamber, there is no need of proving a space in which the ventilation door is pivoted. Thus, the height of the case can be lowered and the unit can be made compact in size. Furthermore, mounting of the unit to the vehicle can be easily made. Furthermore, since the number of parts is reduced, cost reduction is achieved.

According the present invention the defroster door for selectively opening and closing the defroster opening formed in the upper wall of the case in front of the ventilation opening is of a sliding type, like the ventilation door. Furthermore, the rest (or retracted) position of the defroster door is set at an upper portion of the evaporator which does not interfere with the air flow. Accordingly, the air mixing in the mixing chamber is improved and the air distribution to the defroster opening is appropriately achieved. Furthermore, undesired reduction in air amount blown to the vehicle cabin, which would be caused by the air flow resistance by the defroster door, does not occur.

According to the present invention the sliding mechanism for operating the slide door is driven by the gear mechanism. Thus, smoothed operation of the door and easy handling for the door are achieved, and comfortable door controlling is achieved without suffering from noises.

Furthermore, since each cam groove for guiding the guide pins of the slide door has at a terminal end a bent portion for causing, when the slide door comes to the terminal end, the slide door to shift toward the upper wall of the case, the slide door can be pressed against the upper wall of the case when coming to the terminal end. Under this condition, the slide door is stably set in position without play.

According to the present invention the higher teeth of the gear can assuredly bias the slide door when the slide door comes to the terminal end of the cam groove. Accordingly, the mechanism for biasing the slide door can be made simple in construction, and operation of the slide door is carried out with a smaller driving torque.

According to the present invention the seal member intimately contacts the peripheral edges of the openings to achieve a sealing therebetween when the slide door comes to the close position. Thus, undesired air leakage is suppressed, and thus, reduction in air amount blown from a certain opening does not occur, and thus, quality and reliability of the device are improved.

According to the present invention the side ventilation opening is formed in the side wall of the case at a position corresponding to the rest (or retracted position) of the sliding door which is defined at a front or rear position of the center ventilation opening. Accordingly, each of the center ventilation opening and the side ventilation opening can have a sufficiently larger open area. Accordingly, the air flow resistance of these openings can be reduced, and thus, the air amount passing therethrough can be increased.

The slide door for opening and closing the center ventilation opening has a sub-door which selectively opens and closes the side ventilation opening in response to the opening and closing action of the ventilation door. Thus, the air distribution control to the temperature-controlled air flow blown from the center ventilation opening and the side ventilation opening is easily achieved.

According to the present invention the close position of the sub-door is so set as to partially open the side ventilation opening. Accordingly, part of the temperature-controlled air is constantly leaked from the side ventilation opening for use as a side ventilation wind to defrost the door side window panel. Furthermore, the amount of the side ventilation wind is easily controlled by adjusting the close position of the sub-door.

BEST MODE EMBODIMENTS OF THE INVENTION

In the following, embodiments of the present invention will be described with reference to the accompanying drawings.

Embodiment-1

Figure 1:
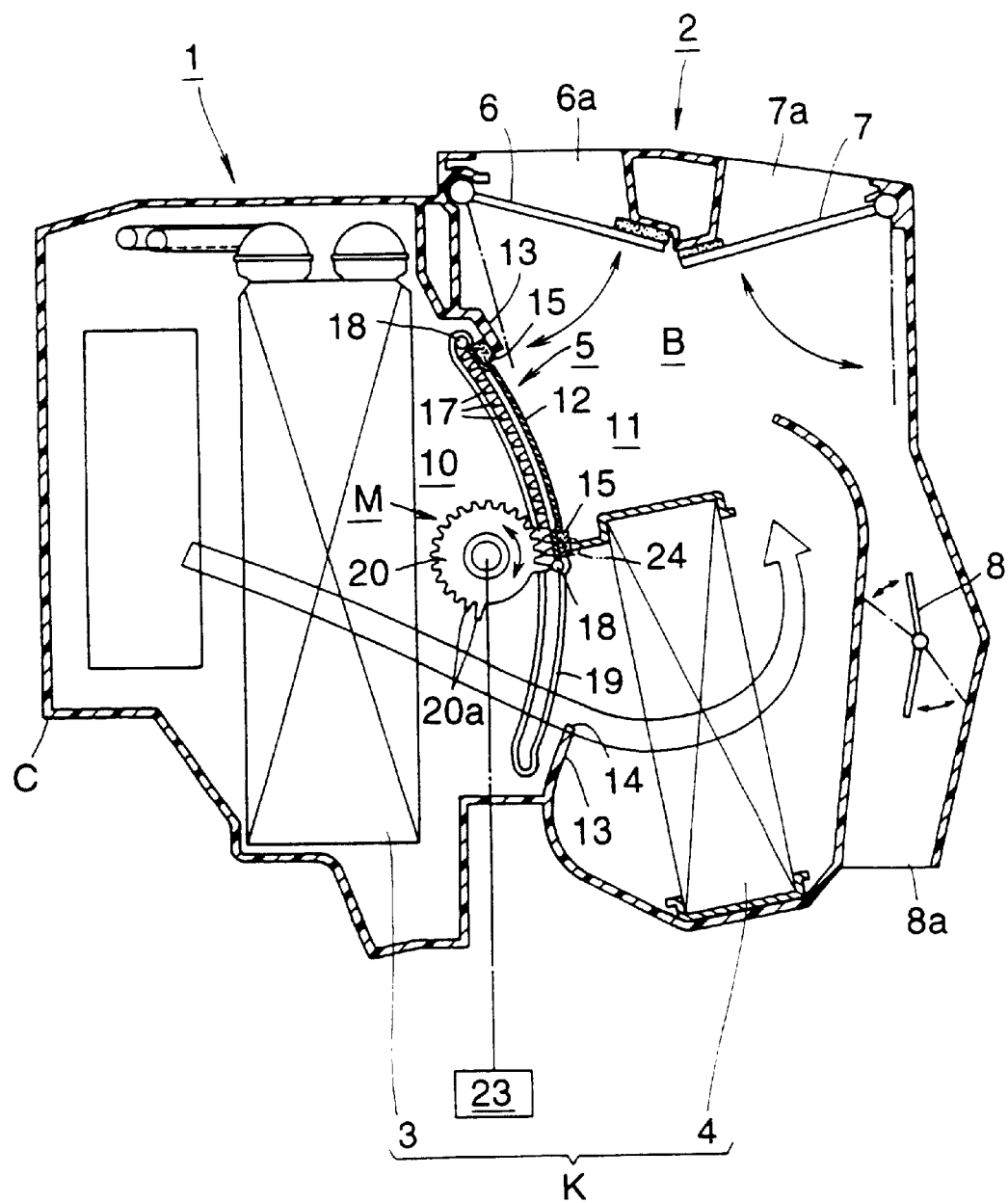
FIG. 1 is a sectional view showing a first embodiment of the present invention.
Figure 2:
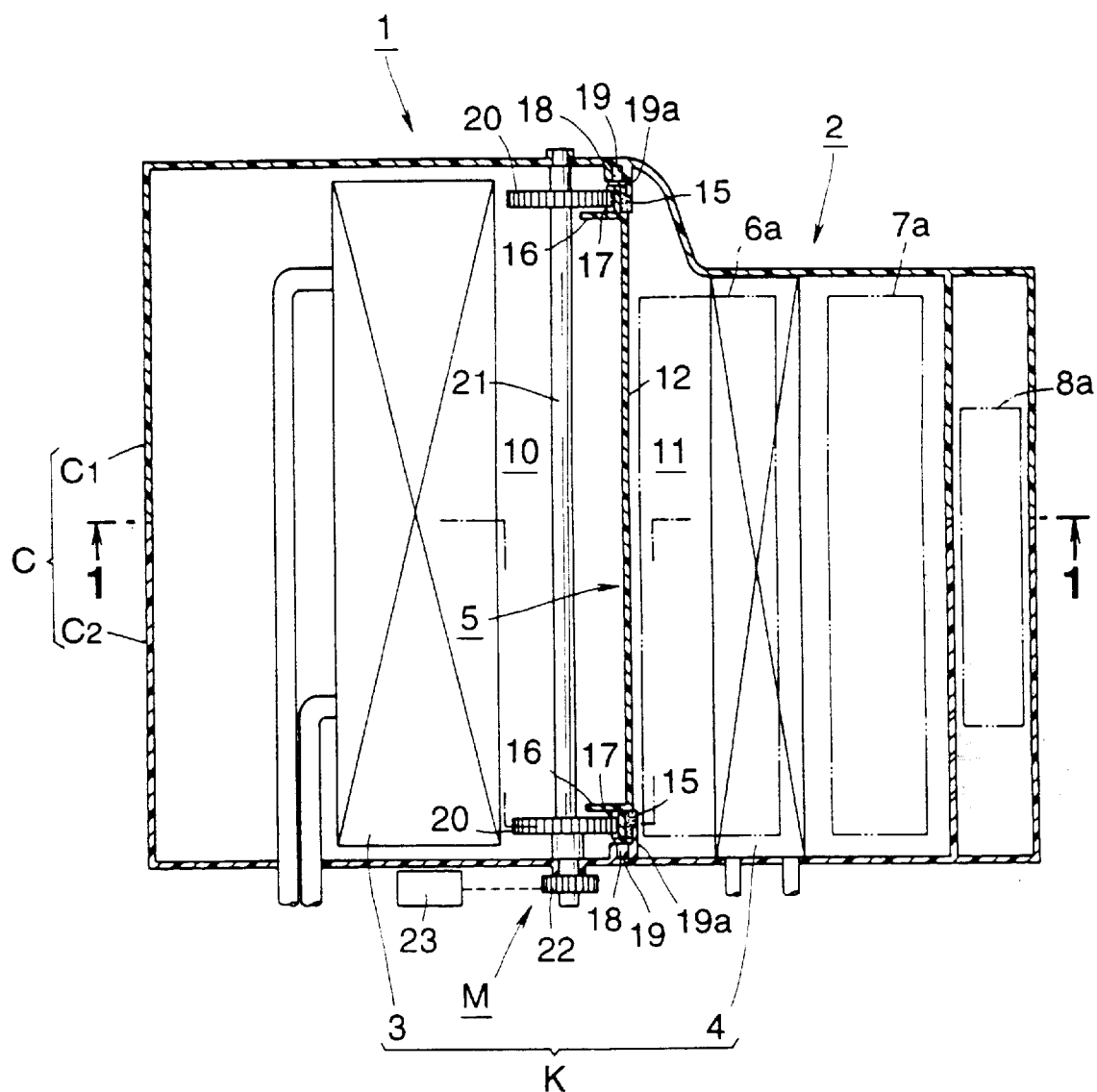
FIG. 2 is a plan view of FIG. 1.
Figure 3:
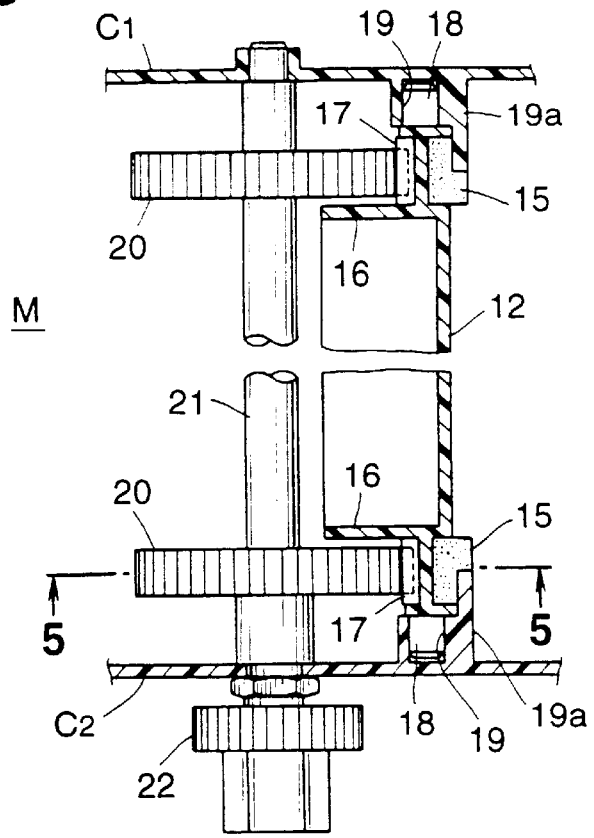
FIG. 3 is a horizontally sectioned view of a door mechanism.
Figure 4:
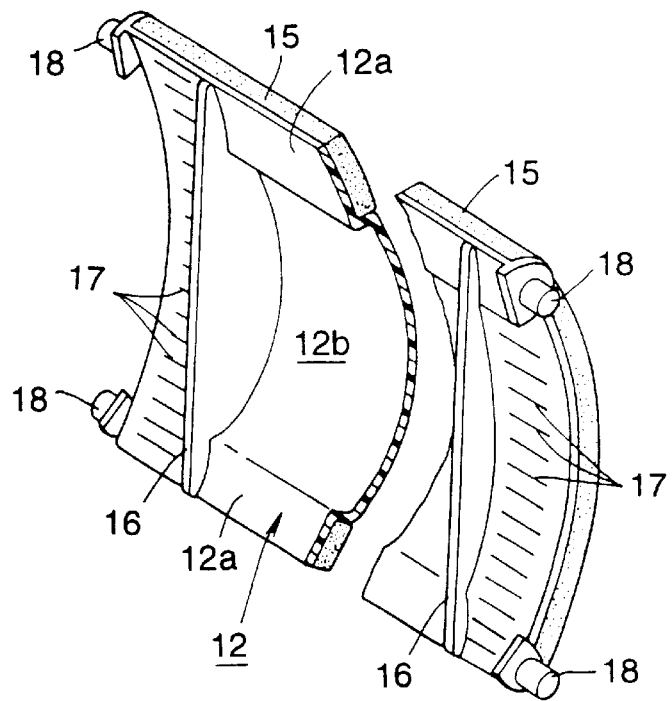
FIG. 4 is a schematically illustrated, partially cut, perspective view of a door.
Figure 5:
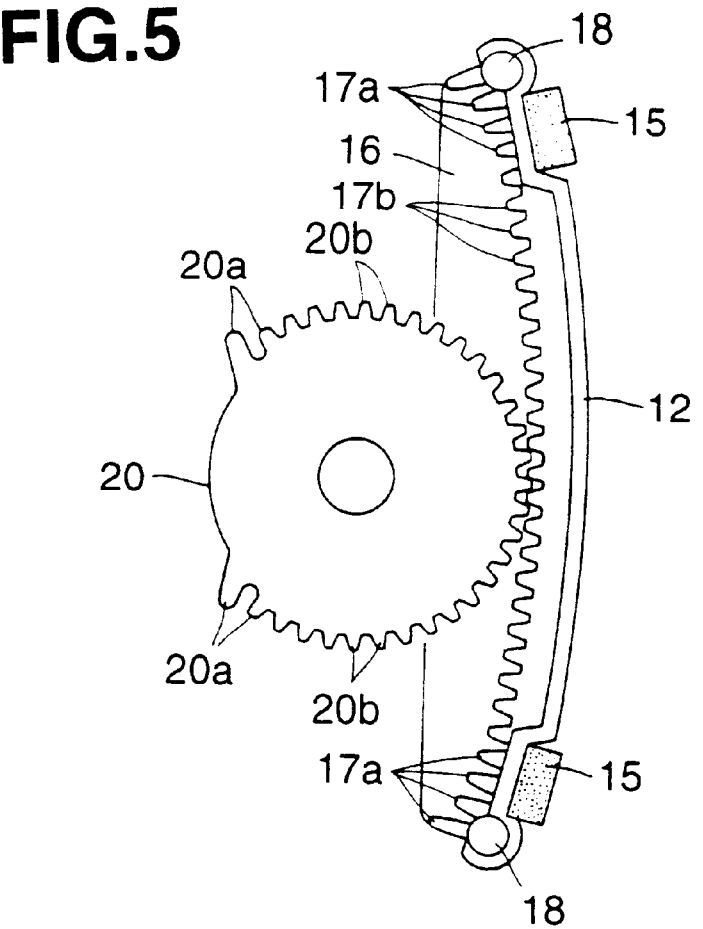
FIG. 5 is a sectional view taken along the line 5—5 of FIG. 3.
Figure 6:
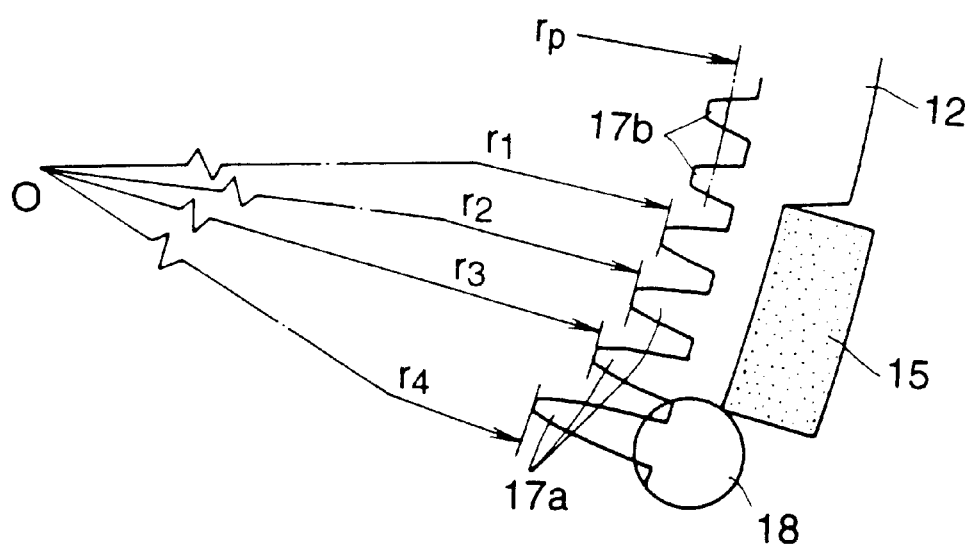
FIG. 6 is an enlarged view of an essential portion of the door.
Figure 7:
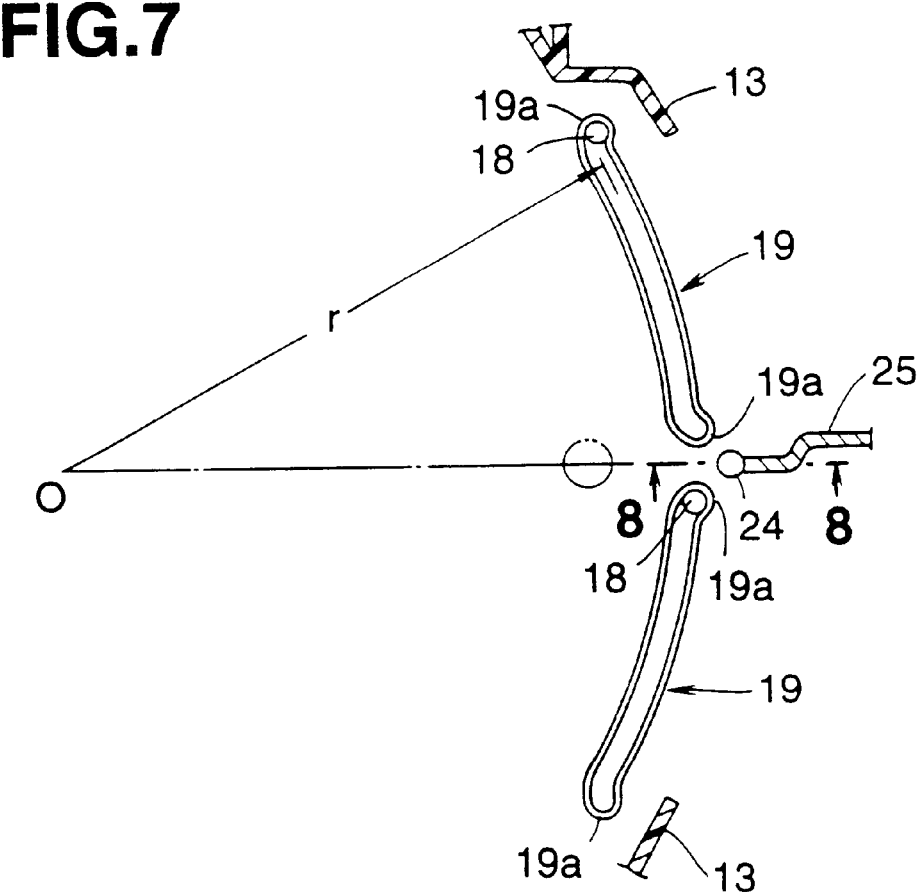
FIG. 7 is an illustration of a cam groove.
Figure 8:
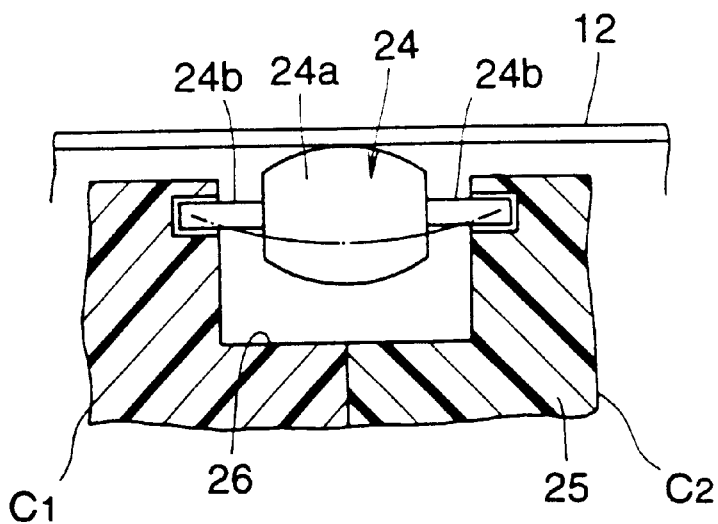
FIG. 8 is a sectional view of a supporting roller.

FIG. 1 is a drawing showing an automotive air conditioning device which is an embodiment of the present invention, which is a sectional view taken along the line 1—1 of FIG. 2. FIG. 2 is a plan view of FIG. 1, FIG. 3 is a horizontally sectional view of a door mechanism, FIG. 4 is a partially cut perspective view of a door, FIG. 5 is an end view taken along the line 5—5 of FIG. 3, FIG. 6 is an enlarged illustration showing an essential portion of the door, FIG. 7 is an illustration showing a cam groove portion, and FIG. 8 is an illustration of a supporting roller, which is a sectional view taken along the line 8—8 of FIG. 7.

As is shown in FIG. 1, a door mechanism of an automotive air conditioning device of the embodiment is applied to a mix door.

Figure 16:
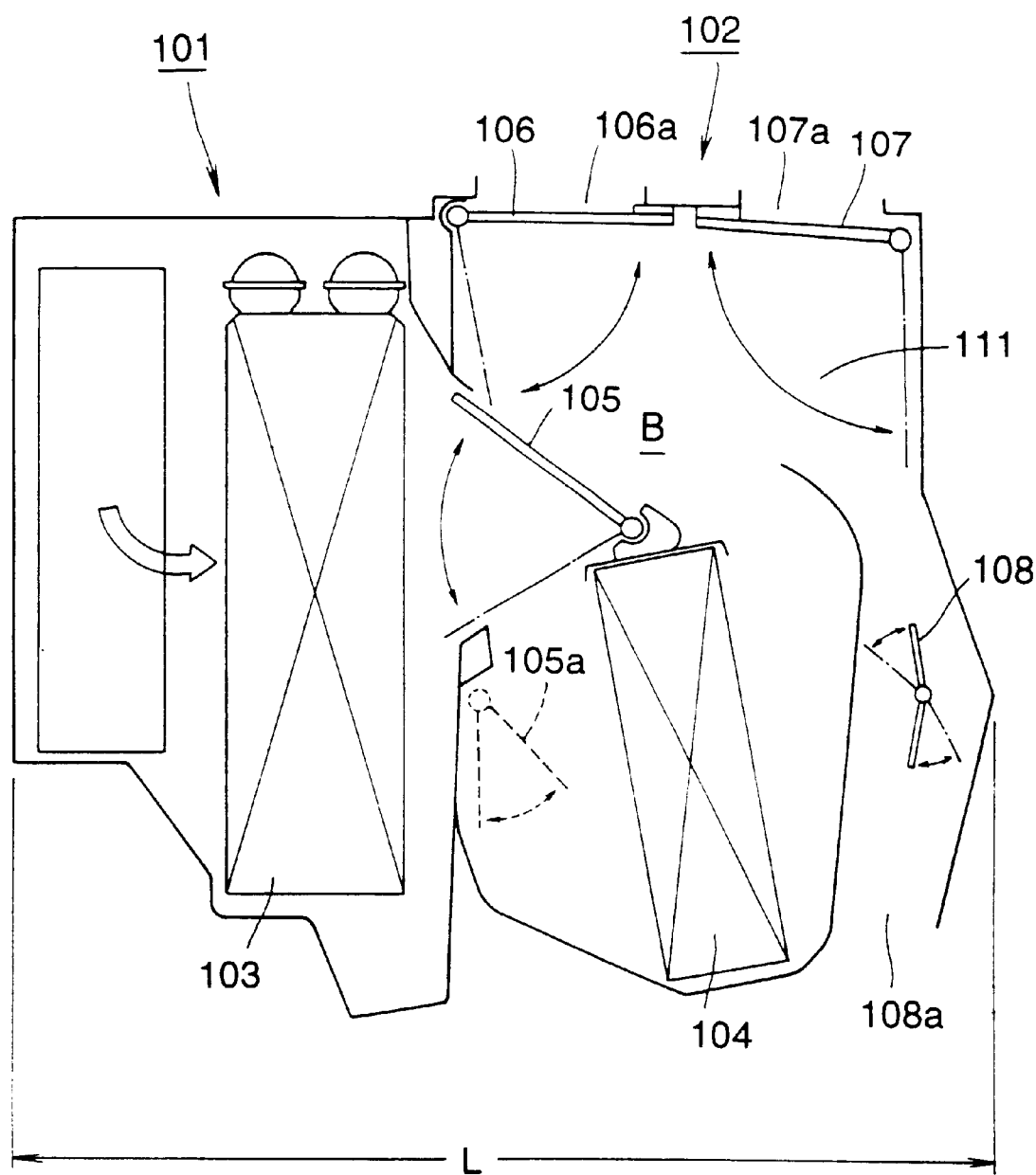
FIG. 16 is a sectional view of a conventional automotive air conditioning device.
Figure 17:
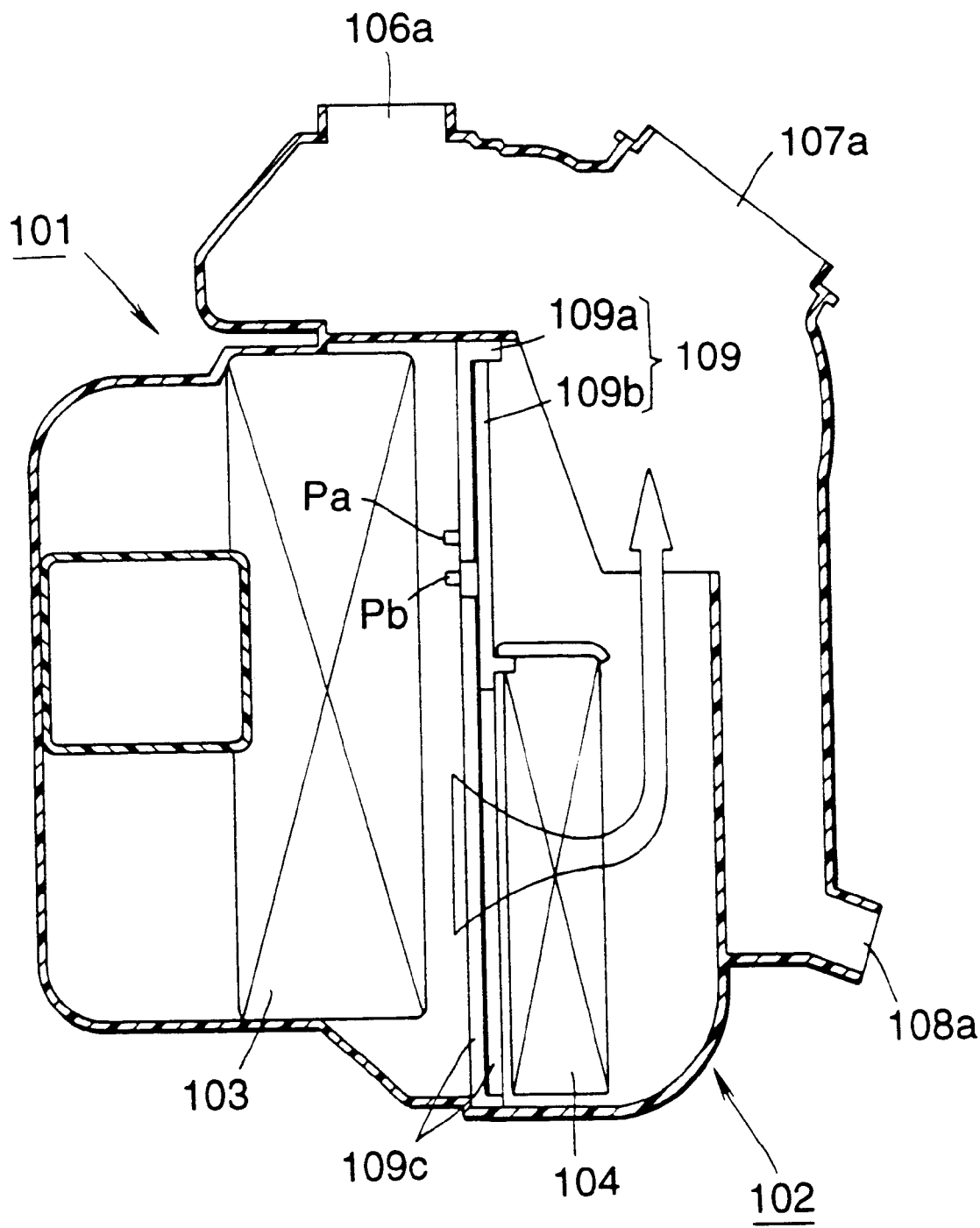
FIG. 17 is a sectional view of another conventional automotive air conditioning device.

As is shown in FIG. 1, the automotive air conditioning device is equipped with a case C which comprises a cooler unit 1 and a heater unit 2 which are united in such a manner as to reduce a longitudinal length "L" (see FIG. 16). In upstream and downstream air passages 10 and 11 of the case C, there are installed an evaporator 3 and a heater core 4, respectively. For facilitation of production of these air passages 10 and 11, the case C is constructed by coupling a pair of case members C1 and C2 (see FIG. 3) in a so-called face-to-face connecting manner.

A mix door 5 is installed between the evaporator 3 and the heater core 4. By sliding the mix door 5 with the aid of a slide mechanism M, the air flow from the upstream passage 10 is selectively led toward the passage of the heater core 4 or a bypass passage B which bypasses the heater core 4, or led into both the two passages at a certain distribution ratio.

At the upstream and downstream sides of the mix door 5, the evaporator 3 and the heater core 4 are closed arranged, which will be referred to as movement limiting structures "K" in the following description since they function to restrict a free movement of the mix door 5.

In the following, the door 5 and the slide mechanism M will be described in detail.

The mix door 5 is arranged between the evaporator 3 and the heater core 4 and comprises a door proper 12 which extends in a direction to shut off the air flow from the upstream air passage 10 and has a convex shape of a certain radius of curvature with its swelled side projected in a downstream direction.

As is shown in FIG. 1. the vertical length of the door proper 12 is about half that of an opening 14 defined between the upstream air passage 10 and the downstream air passage 11, and as is seen from FIG. 2, the lateral length of the door proper is substantially equal to the distance between opposed side walls of the case C.

As is shown in FIG. 4, the door proper 12 comprises an outer side flat portion 12a and an inner side dome-shaped swelled portion 12b. An outer surface of the outer side flat portion 12a is lined with a seal member 15 made of urethane foam or the like. If desired, outer and inner surfaces of the swelled portion 12b may be lined with such seal members 15. It is to be noted that lateral end portions of the door proper 12, where after-mentioned toothed portions 17 are formed, have each an arcuate cross section.

At laterally end portions of the door proper 12, there are provided respective reinforcing plates 16 which reinforce the door proper 12 and have a function to guide the air flow. Between each reinforcing plate and one lateral end portion of the door proper 12, there is formed the toothed portion 17 with which a partial gear 20 of an after-mentioned drive device 23 is meshed, the toothed portion extending in a vertical direction.

At four corners of the door proper 12, there are provided projected guide rollers 18 which are rotatably and slidably received in after-mentioned guide cam grooves 19 which are formed in ridges projected inward from inside walls of the case C.

As is shown in FIG. 3, the slide mechanism M for operating the slide door 5 comprises cam grooves 19 formed in ridges on inner surfaces of the case C, a pair of partial gears 20 meshed with the toothed portions 17 formed on the surface of the door 5, a shaft 21 connecting the partial gears 20, a drive gear 22 fixed to an end of the shaft 21 and a drive device 23 (see FIGS. 1 and 2), such as a motor and motor actuator, which drives the drive gear 22. If desired, in place of the drive device 23, a manually operated mechanism connected to a controller through a wire cable may be used.

As is shown in FIG. 7, the guide cam grooves 19 are each shaped to have a radius of curvature "r" substantially equal to that of the door 5 and support or movably receive the four guide rollers 18 of the door proper 12, so that the door D is assuredly operated without play even if applied with a certain wind pressure. The guide cam grooves 19 are arcuate in shape and arranged at upper and lower portions of each inner wall. Preferably, each cam groove is so curved as to swell in a downstream direction with a certain radius of curvature "r". When, with this arrangement, the door proper 12 used as a mix door is moved in a direction of the gravity, that is, in a vertical direction, the cam grooves 19 can support the weight of the door proper 12, so that the upward and downward movement of the door is hardly affected by the gravity and thus the movement of the door is carried out by a certain controlled variable thereby improving the controllability. Since the upper guide rollers 18 are put in the upper cam grooves 19 and the lower guide rollers 18 and put in the lower cam grooves 19, influence by the gravity is suppressed or at least minimized by the four guide rollers 18.

Each cam groove 19 has an outer terminal end portion 19a at a position which the door proper 12 assumes when it slides to its terminal position, the outer terminal end portion 19a being directed toward a direction angled to the sliding direction of the door proper 12. That is, in the illustrated embodiment, the outer terminal end portion extends obliquely rearward from the end portion of the arcuate sliding path.

With the above-mentioned arrangement, the seal member 15 is forced to contact with a partition wall 13 and pressed against the same to enhance its sealing performance. The seal member 15 is not a member which constantly contacts the partition wall 13, but a member which contacts the partition wall when really needed. Accordingly, the sealing performance of the seal member can be kept for a long period and thus assured sealing is expected for a long period. In the illustrated embodiment, the contacting member 13 to which the sealing member 15 contacts is the partition wall 13 of the case C. However, if desired, the contacting member 13 may be a member which is separate from the case.

In the illustrated embodiment, each of the cam grooves 19 comprises separate upper and lower portions. However, the present invention is not limited to such separate arrangement. That is, any other arrangements may be employed so long as, at the terminal position of the door, the guide roller 18 is caused to move in a direction angled to the sliding direction of the door. That is, for example, an arrangement may be used wherein the terminal ends 19a of the upper and lower cam grooves 19 are connected. If this arrangement is practically employed, molding of the case C with a plastic is much easily made.

The above-mentioned sliding mechanism M comprises the cam grooves 19, the paired partial gears 20, the shaft 21 and the drive gear 22. If desired, these parts and the door 5 may be preassembled as a single unit before a final assembly. In this modification, the single unit is put into the case C through an opening formed in a side wall of the case C and set therein. In this case, depending on the types of the air conditioning devices, various kinds of units can be prepared, so that mounting of automotive air conditioning devices to vehicles is achieved with some essential parts commonly used.

Each of the partial gears 20 has a unique shape for the purpose of causing the door proper 12 to be directed at the terminal position thereof in a direction angled to the sliding direction of the door. That is, as is seen from FIG. 5, each partial gear 20 has enlarged or higher teeth 20a at end portions thereof, which are higher than other teeth 20b of the gear. That is, when the partial gear 20 is driven by the above-mentioned drive device 23, the higher teeth 20a press the door proper 12 through the toothed portion 17 of the door proper 12 and move the door proper along the cam grooves 19.

As is seen from FIGS. 5 and 6, each of the toothed portions 17 possessed by the door proper 12 has higher teeth 17a at upper or lower end portions thereof, which are higher than other teeth 17b of the toothed portion. That is, as is seen from FIG. 6, the heights of the higher teeth gradually change in accordance with a change of the distances, viz., r1, r2, r3 and r4, between the tops of the teeth and a rotation center O. With this, the higher teeth 17a are assuredly meshed with the higher teeth 20a of the partial gear 20, so that the door proper 12 is assuredly driven along the cam grooves 19. Denoted by reference "rp" is a pitch circle.

As has been mentioned hereinabove, the door proper 12 is driven by the two partial gears 20. However, if the door proper 12 has a relatively long lateral length, it tends to occur that the door proper becomes deformed when applied with a marked wind pressure.

This deformation is undesirable when considering the necessity of assured meshing of the gears and satisfied temperature controlling by the door proper 12. Thus, as is shown in FIG. 8, an arrangement is provided wherein a laterally middle portion of the door proper 12 is supported by a roller 24 for suppressing such undesired deformation.

In this case, the roller 24 comprises a drum-like portion 24a and a pair of resilient supporting arms 24b which are projected axially in opposite directions from the drum-like portion 24a. For installing the roller 24 in the case, a preferable arrangement is such that the supporting arms 24b are put in a recess 26 formed in a center partition wall 25 integrally connected to an upper supporting wall of the heater core 4, and the drum-like portion 24a is arranged to project by a certain degree from the center partition wall 25 thereby to resiliently contact with the door proper 12.

As is described hereinabove, the case C is constructed by coupling the two casing members C1 and C2 in a so-called face-to-face connecting manner. Accordingly, installing of the supporting roller 24 to the center partition wall 25 can be so made that under molding of the case C, the supporting roller 24 is kept in the recess 26 of the center partition wall 25 which has been divided into two. That is, installing of the supporting roller and molding of the case are achieved at the same time.

In the following, operation of the embodiment will be described.

Full hot mode

In a full-hot mode of a heating mode, wherein cooled air is entirely heated and blown to the vehicle cabin, the door proper 12 takes an uppermost position as shown in FIG. 1, so that air which has been introduced by the intake unit and cooled by the cooler unit 1 is entirely passed through the heater core 4.

In this case, the drive device 23 is operated by receiving instruction signals from a controller (not shown), so that the partial gears 20 are rotated. Thus, the partial gears 20 meshed with the toothed portions 17 formed on the door proper 12 raise the door proper 12 along the cam grooves 19.

When the door proper 12 is raised up to a terminal position, the higher teeth 20a of the partial gears 20 are brought into engagement with the higher teeth 17a of the door proper 12. Upon this, the door proper 12 is pressed backward by the partial gears 20 and driven backward along the cam grooves 19 having the seal member 15 pressed against the partition wall 13 of the case C.

As a result, the sealing of the door proper 12 is assured suppressing undesired air leakage, and thus, excellent air temperature controlling is obtained. Furthermore, since the door movement is carried out by the gear mechanism, smoothed door operation and easy door handling are obtained without suffering from noises.

In this mode, the air cooled by the cooler unit is forced to impinge against the curved door proper 12. Since, during the flow, the air flow is smoothly guided by a curved surface of the door proper 12 and thus directed toward the heater core 4, increase in air flow resistance and reduction in air flow amount are suppressed or at least minimized. That is, entire of the cooled air is led to the heater core 4.

Temperature control mode

In a temperature control mode in a cooling/heating mode, wherein cooled air and warmed air are mixed before being blown to the vehicle cabin, the door proper 12 takes a vertically middle position in FIG. 1, so that part of cooled air from the cooler unit 1 is forced to flow through an upper clearance defined above the door proper 12 and at the same time the remained part of the cooled air is forced to flow toward the heat core 4 through a lower clearance defined below the door proper 12.

Also in this case, the drive device 23 is operated by the controller, so that due to rotation of the partial gears 20, the guide rollers 18 of the door proper 12 are moved along the guide cam grooves 19 carrying the door proper to be above-mentioned vertically middle position. Since this movement is carried out while contacting the guide rollers 18 with the cam grooves 19, the sliding resistance is very small and thus the movement is smoothly made. When the door proper 12 is moved in the direction of the gravity, that is, in a vertical direction, the weight of the door proper 12 is supported by the cam grooves 19. Thus, movement of the door proper is hardly affected by the gravity, and thus satisfied controllability of the door can be exhibited irrespective of positions taken by the door.

Furthermore, in this mode, due to the meshed engagement between the partial gears 20 and the toothed portions 17 of the door proper 12, the position of the door proper 12 is kept, and thus the possibility of undesired slipping or displacement of the door proper 12 from a set position is very small. Even if such undesired displacement takes place, it would be only within a degree corresponding to a back lash which occurs between the partial gears 20 and the toothed portions 17 of the door proper 12, and thus, precise positioning of the door proper 12 is achieved.

The cooled air and warmed air are mixed to have a certain temperature and blown to the vehicle cabin. In the curved door, the air flow resistance is slightly increased. However, in this case, the air distribution ability (viz., ability of directing the air in a desired direction) is increased, which is desirable in this mode wherein controllability is valued as compared with air flow amount.

As is shown in FIG. 7, the guide cam grooves 19 are each shaped to have a radius of curvature "r" substantially equal to that of the door 5 and support or movably receive the four guide rollers 18 of the door proper 12, so that the door D is assuredly operated without play even if applied with a certain wind pressure. The guide cam grooves 19 are arcuate in shape and arranged at upper and lower portions of each inner wall. Preferably, each cam groove is so curved as to swell in a downstream direction with a certain radius of curvature "r". When, with this arrangement, the door proper 12 used as a mix door is moved in a direction of the gravity, that is, in a vertical direction, the cam grooves 19 can support the weight of the door proper 12, so that the upward and downward movement of the door is hardly affected by the gravity and thus the movement of the door is carried out by a certain controlled variable thereby improving the controllability. Since the upper guide rollers 18 are put in the upper cam grooves 19 and the lower guide rollers 18 and put in the lower cam grooves 19, influence by the gravity is suppressed or at least minimized by the four guide rollers 18.

Full-cool mode

In a full-cool mode of a cooling mode, wherein cooled air is entirely blown to the vehicle cabin without being heated, the door proper 12 takes a lowermost position in FIG. 1. Except the positioning of the door proper 12, substantially the same operation as that of the above-mentioned full-hot mode takes place. However, under this full-cool mode, it sometimes occurs that the passenger want a larger quantity of cooled air. Also in this case, the air flow can be smoothly directed toward the ventilation opening 7a by the surface of the door proper 12. Thus, the air flow resistance does not increase and the air flow amount does not reduce, which brings about a comfortable cooling felt by the passengers.

In this full-cool mode, a much amount of cooled air is forced to impinge against the door proper 12, which causes such a tendency that the door proper 12, which has a relatively long width, becomes deformed or flexed in a downstream direction. However, since, in this first embodiment, the laterally middle portion of the door proper 12 is resiliently supported by the supporting roller 24, undesired deformation of the door proper 12 is prevented even when a marked wind pressure is applied to the door proper 12. Furthermore, due to the same reason, smoothed operation of the door is achieved without suffering from undesired gear slippage, and lowering in the temperature controlling performance, which would be caused by the deformation of the door proper 12, does not occur. Furthermore, even if the door proper 12 is somewhat deformed under the influence of heat produced by the evaporator 3 and the heater core 4 which are positioned near the door proper, the deformation of the door proper 12 can be minimized.

Since the supporting roller 24 constantly supports the middle portion of the door proper 12, the upward and downward movement of the door proper 12 along the curved path is smoothly carried out in not only the full-cool mode but also every other modes.

The present invention is not limited to the above-mentioned arrangement of the embodiment. That is, various modifications of the arrangement are available so long as they do not deviate the concept of the invention. That is, for example, a door to which the door mechanism of the invention is applied is not limited to the mix door. That is, the door mechanism may be applied to other type doors. Furthermore, the radius of curvature defined by the downstream projected convex portion possessed by the door may be varied in accordance with the type of the mechanism, the size of the door and the air flow amount needed.

Figure 9:
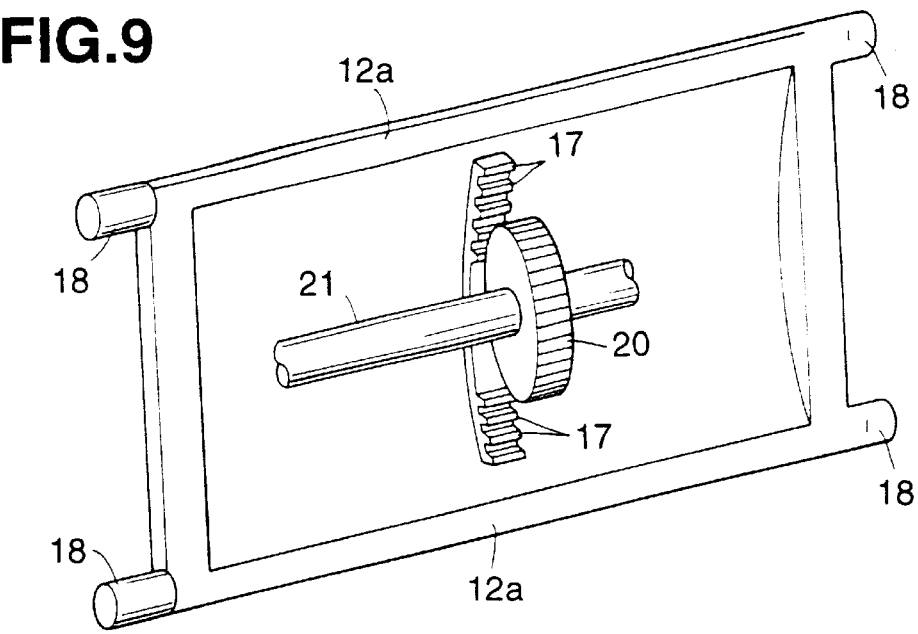
FIG. 9 is a schematically illustrated perspective view of another door employable in the invention.

The above-mentioned mix door 5 is arranged to be driven by the two partial gears 20. However, if desired, as is seen from FIG. 9, the driving may be made by only one gear 20 arranged at a middle portion of the door proper 12. With this arrangement, the number of parts can be reduced, the assembly can be simplified and the cost can be reduced. Furthermore, since the supporting of the door proper 12 is made by both the supporting roller 24 and the gear 20, the temperature controlling performance is not affected even if the door proper is subjected to a slight deformation.

Embodiment-2

Figure 10:
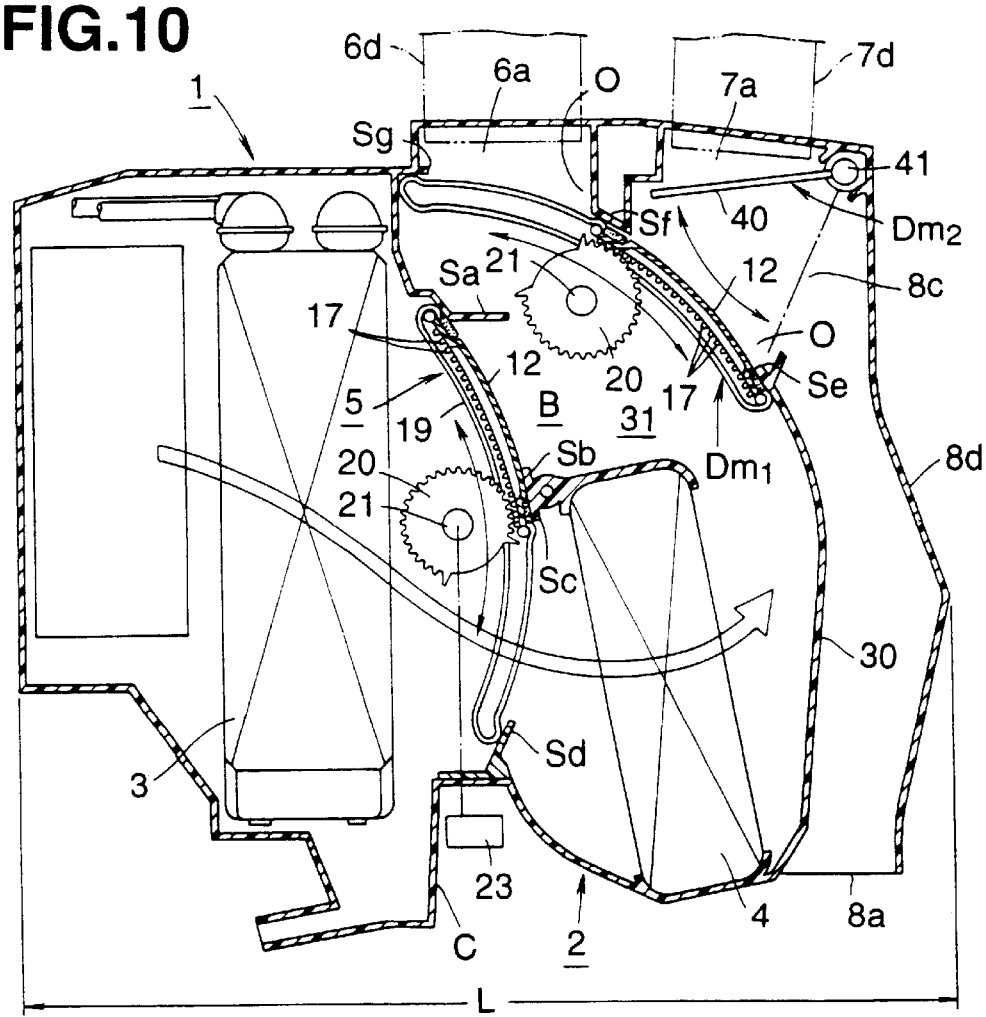
FIG. 10 is a sectional view showing a second embodiment of the present invention.

The automotive air conditioning device of this embodiment comprises, as is seen from FIG. 10, a unit case "C" which has a short longitudinal length "L" and includes a cooler unit 1 and a heater unit 2 which are united and aligned in a fore-and-aft direction of the associated motor vehicle.

Within the unit case C, there are installed an evaporator 3 which produces a cooled air by cooling air introduced thereto, a heater core 4 which produces a warmed air by heating the cooled air, a mixing chamber 31 which mixes the cooled air and the warmed air to produce a temperature-controlled air, a hoot duct 8d which is defined by both the mixing chamber 31 and a swelled inside wall 30, a defroster opening 6a and a ventilation-foot opening 40 which are arranged at an extension line of the inside wall 30, and a door mechanism which functions to control the cooled air and warmed air.

The door mechanism comprises a slide type mix door 5 which is arranged between the evaporator 3 and the heater core 4, a slide type first mode door Dm1 which opens and closes the defroster opening 6a and the ventilation-foot opening 40, and a pivot type second mode door Dm2 which opens and closes the ventilation opening 7a provided at an upper end portion of the foot duct 8d and a foot opening 8a.

The mix door 5 is a device which selects selectively leads the cooled air from the evaporator 3 toward a passage for the heater core 4 or toward a bypass passage "B" bypassing the heater core 4, or distributes the cooled air into both the two passages at a given ratio to control the temperature of the air blown into the vehicle cabin.

The first mode door Dm1 provides both a condition wherein depending on modes, only one of the defroster opening 6a and the ventilation-foot opening 40 is selectively opened or closed and a condition wherein both the openings 6a and 40 are opened at a predetermined ratio.

That is, in response to the movement of the first mode door Dm1, there are produced a defroster mode (viz., a mode for blowing warmed air against front and side glass windows to defrost the same) wherein the defroster opening 6a is opened, a ventilation mode (viz., a mode for blowing cooled air from the ventilation duct 7d toward an upper half portion of a passenger) wherein with the aid of the second mode door Dm2, the ventilation-foot opening 40 is opened, a dual level mode (viz., a "keeping one's head cool and one's feet warm" mode for blowing cooled air toward an upper half of the passenger and blowing warmed air toward the feet of the passenger), and a foot mode (viz., a mode for blowing warmed-air toward the feet of the passenger).

The pivotal type second mode door Dm2 is arranged to pivot about a pivot shaft 41, which, when the ventilation-foot opening 40 is opened, distributes the air (usually, warmed air or temperature-controlled air) directed thereto to various selected portions. The modes selected by this second mode door Dm2 are the ventilation mode wherein the air flow is led to the ventilation duct 7d, the foot mode wherein the air flow is led to the foot duct 8d to warm the foot of the passenger, and the dual-level mode wherein the air flow is led to both the ventilation duct and the foot duct.

When the first mode door Dm1 is moved to a middle position to open both the defroster opening 6a and the ventilation-foot opening 40 and the second mode door Dm2 is moved to open the foot duct 8d, the air is distributed to the defroster duct 6d and the foot duct 8d at a given ratio, so that defrosting of the window panes and warming of the foot portion are achieved at the same time.

Particularly, in the embodiment, a measure is employed wherein even when turned, the second mode door Dm2 does not enter the area of the mixing chamber 31 defined by the first mode door Dm1 and the inside wall 30. With the measure, the flow of cooled air and warmed air is not disturbed by the second mode door Dm2 even when the second mode door Dm2 is turned to a position to bring about the ventilation mode or the foot mode, and thus the cooled air and the warmed air can flow stably and mixing of the cooled air and warmed air is stably carried out thereby effecting a satisfied mixing. As a result, there is no need of employing a temperature controlling rib which has been employed in a conventional device, and thus, undesired increase in air flow resistance does not occur, which brings about improvement in the temperature controlling. Furthermore, due to non-use of the temperature controlling rib and simplified construction of the door operating mechanism, marked advantages in cost are expected.

As is described hereinabove, in the embodiment, by the movements of the mix door 5, the first mode door Dm1 and the second mode door Dm2, various modes, such as ventilation mode, Dual level mode, defroster mode, foot mode and defroster-foot mode, are obtained. Furthermore, even in the foot mode wherein the air is forced to flow in the longest path defined in the unit case C, the air flow is smoothly led into the foot duct 8d from the ventilation-foot opening 40 without increasing the air flow resistance. Furthermore, even when the pivotal type second mode door Dm2 is positioned close to the slide type first mode door Dm1, the doors do not interfere with each other and thus these doors can smoothly move in the limited space.

Furthermore, since the first mode door Dm1 is arranged to slide along the convex surface of the inside wall 30, the warmed air from the heater core 4 is allowed to flow along the first mode door Dm1 after flowing along the convex surface of the inside wall 30. Thus, undesired noise is not produced and the air flow resistance is not increased, which brings about a smoothed flow of the air. Since the cooled air bypassing the heater core 4 and the warmed air passing through the heater core 4 impinge against each other at a constant angle, stable air mixing is achieved. Since the mix door 5, the first mode door Dm1 and the sliding mechanism of the doors are substantially the same as those of the above-mentioned first embodiment, description of them will be omitted.

In the following, operation of the second embodiment will be described.

(Ventilation mode)

The ventilation mode is the mode for cooling the vehicle cabin. In a full-cool mode of the ventilation mode, wherein the cooled air is entirely blown into the vehicle cabin without being heated, the mix door 5 assumes the lowermost position in the drawing. However, when neutral temperature controlling is needed, the mix door assumes a middle position.

In this case, the drive device 23 is operated by receiving instruction signals issued from a controller (not shown), so that the partial gears 20 are rotated. Thus, the partial gears 20 meshed with the toothed portions 17 formed on the door proper 12 lower the door proper 12 along the cam grooves 19.

In the full-cool mode, the door proper 12 takes the lowermost position. In this case, the higher teeth 20a of the partial gears 20 are meshed with the higher teeth 17a of the door proper 12, so that the door proper 12 is pressed backward by the partial gears 20 and driven backward along the cam grooves 19 having the seal member 15 pressed against the contacting wall portions Sc and Sd which are formed on side walls of the case C.

As a result, the sealing of the door proper 12 is improved and thus undesired leakage of air warmed at the heater core is suppressed. Thus, there is no need of employing a cock which has been used in a conventional device for stopping the flow of warmed water toward the heater core. Furthermore, since the air leakage is suppressed, the temperature controlling is improved. Furthermore, since the door movement is carried out with the gear driving, a smoothed, improved, silent and comfortable door controlling is achieved.

When the first mode door Dm1 takes the leftmost position in FIG. 10, the cooled air flow from the evaporator 3 runs along the convex surface of the mix door 5, then through the mix chamber 31, then through the ventilation-foot opening 40 straightly, then through the ventilation opening 7a and then through the ventilation duct 7d and into the vehicle cabin. Since the air flow resistance is low, larger amount of cooled air can be blown into the vehicle cabin.

In this full-cool mode, it sometimes occurs that the passengers want much amount of cooled air. In this case, large amount of cooled air impinges against the door proper 12, which causes such a tendency that the door proper 12, which has a relatively long width, becomes deformed or flexed in a downstream direction.

However, since, in this embodiment, the laterally middle portion of the door proper 12 is resiliently supported by the supporting roller 24, undesired deformation of the door proper 12 is prevented even when a marked wind pressure is applied to the door proper 12. Furthermore, due to the same reason, smoothed operation of the door is carried out without suffering from undesired gear slippage, and lowering in the temperature controlling performance, which would be caused by the deformation of the door proper 12, does not occur. Furthermore, even if the door proper 12 is somewhat deformed under the is influence of heat produced by the evaporator 3 and the heater core 4 which are positioned near the door proper, the deformation of the door proper 12 can be minimized.

Since the supporting roller 24 constantly supports the door proper 12, the upward and downward movement of the door proper 12 is smoothly made in not only the full-cool mode but also any other modes.

In case of setting the temperature at a middle range, the mix door 5 is brought to a vertically middle position. Also in this case, the driving device 23 is operated by the controller, so that due to rotation of the partial gears 20, the guide rollers 18 of the door proper 12 are moved along the cam grooves 19 moving the door proper 12 to the vertically middle position. Since, under this condition, the holding of the door proper is made by only the contact between the guide rollers 18 and the cam grooves 19, the door sliding resistance is very small and thus the movement of the door is smoothly carried out.

Under this condition, the mix door 5 is stably held due to the meshed engagement between the partial gears 20 and the toothed portions 17 of the door proper 12, and thus, the possibility of undesired slipping or displacement of the door proper 12 from a set position is very low. Even if such undesired displacement takes place, it would be only with a degree corresponding to a back lash which occurs between the partial gears 20 and the toothed portions 17 of the door proper 12, and thus precise positioning of the door proper 12 is achieved.

In this condition, part of the cooled air flow from the evaporator 3 passes through a clearance defined between the upper end of the mix door 5 and a contacting upper wall portion Sa and comes into the mixing chamber 31 through the bypass passage B, and the remaining part of the cooled air flow passes through a clearance defined between the lower end of the mix door 5 and a contacting lower wall portion Sd, comes to the heater core 4 to be heated and comes into the mixing chamber 31 after flowing along the swelled surface of the inside wall 30. In this mixing chamber 31, the cooled air and the warmed air are mixed to provide an air flow having a certain temperature and the mixed air flow is directed toward the interior of the vehicle cabin through the ventilation opening 7a and the ventilation duct 7d.

Since the second mode door Dm2 is arranged not to enter or pivot to the area of the mixing chamber 31, unlike a conventional automotive air conditioning device wherein a mode door is arranged to enter or pivot into the area of the mixing chamber, the air flow running through the bypass passage B is not disturbed by the door allowing a smoothed air flow. Thus, the air from the bypass passage can be smoothly mixed with the warmed air and thus the air temperature controlling is assuredly made.

The inside wall 30 which partially defines the mixing chamber 31 has the convex surface, and the first mode door Dm1 is arranged to slide along the curved way matched with the convex surface. Thus, after flowing along the convex surface of the inside wall 30, the warmed air from the heater core 4 is forced to flow along the first mode door Dm1. Thus, undesired air flow noise is not produced and the air flow resistance is not increased, which brings about a smoothed air flow establishing a smoothed mixing between the cooled air and the warmed air.

(Foot mode)

Foot mode is a mode for warming the vehicle cabin. In the full hot mode wherein the cooled air is entirely heated and blown into the vehicle cabin, the mix door 5 is brought to the uppermost position by the drive device 23 upon receiving a signal from the controller (not shown). While, when it is needed to set the air temperature at a middle range, the mix door 5 is brought to a vertically middle position.

When, in case of the full hot mode, the door proper 12 is raised up to the uppermost position, the door proper 12 is forced to move backward like in the case of the above-mentioned embodiment. With this backward movement, the sealing of the door proper 12 is improved, and appropriate temperature controlling and smoothed door movement are obtained. When the first mode door Dm1 is brought to the leftmost position of FIG. 10, the warmed air from the heater core 4, after flowing along the convex surface of the inside wall 30, flows into the ventilation-foot opening 40. Since the ventilation opening 7a is closed by the second mode door Dm2, the above-mentioned warmed air is forced to flow toward the foot duct 8d and blown toward the foot portion of the passenger. In this foot mode, the air flow is smoothly led into the foot duct 8d from the ventilation-foot opening 40, and thus, undesired increase in air flow resistance does not occur.

(Dual level mode)

This mode is the mode wherein the cooled air is blown toward an upper half portion of the passenger through the ventilation opening 7a and the ventilation duct 7d and the warmed air is blown toward the foot portion of the passenger through the ventilation-foot opening 40 and the foot duct 8d.

For achieving this mode, the mix door 5 is set at the vertically middle position, the first mode door Dm1 is set to close the defroster opening 6a and the second mode door Dm2 is set at the vertically middle position to open both the ventilation opening 7a and the foot opening 8c.

Under this condition, part of the air flow cooled by the evaporator 3 passes through the clearance between the upper end of the mix door 5 and the contacting upper wall portion Sa and comes into the mixing chamber 31 through the bypass passage B, and the remaining part of the cooled air passes through the clearance between the lower end of the mode door 5 and the contacting lower wall portion Sd, comes to the heater core 4 to be heated and comes into the mixing chamber 31 after flowing along the swelled surface of the inside wall 30.

However, since the ventilation opening 7a is kept closed, the cooled air is forced to run into the ventilation duct 7d from the bypass passage. Since the ventilation-foot opening 40 is kept opened, the warmed air is permitted to run into the foot duct 8d while being controlled by the second mode door Dm2. As a result, without being mixed, the cooled air and the warmed air are respectively blown toward the upper half portion and the foot portion of the passenger through the ventilation duct 7d and the foot duct 8d.

(Defroster mode)

This mode is a mode for defrosting a front glass window. That is, in case of blowing a high temperature air, the mix door 5 is moved up to the uppermost position, and in case of blowing a middle-range temperature air, the mix door 5 is set at the middle position. The first mode door Dm1 is set at the rightmost position in FIG. 10, so that the warmed air from the heater core 4 is let into the defroster opening 6a.

Since, in the defroster mode, the ventilation-foot opening 40 is closed by the first mode door Dm1, the warmed air is led into the defroster duct 6d and directed toward the front glass window. The air warmed when passing through the heater core 4 flows upward along the inside walls, then flows along the second mode door Dm2 and then smoothly flows into the defroster opening 6a. Since the air flow resistance is reduced, a larger amount of air can be blown against the front glass window to effectively defrost the same.

The present invention is not limited to the above-mentioned arrangements. That is, any other arrangements may be employed so long as they do not deviate the concept of the invention.

The first mode door Dm1 is shaped arcuate. However, if desired, the door may be shaped flat. Furthermore, the mounting position of the first mode door is not only a position on the extension line of the curved inside wall 30 but also a position on the inside wall 30 when the inside wall 30 is shaped flat.

Figure 11:
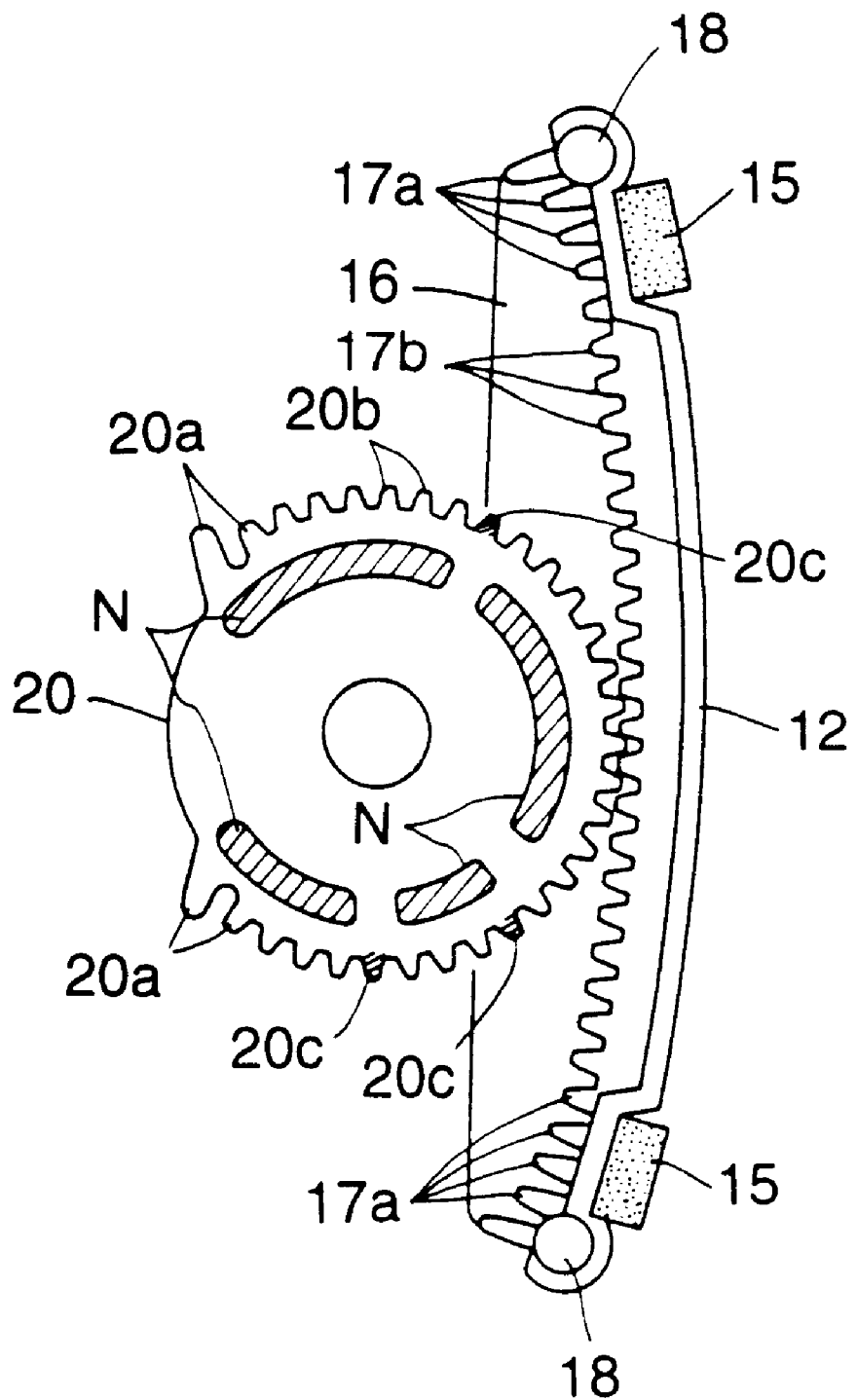
FIG. 11 is a view similar to FIG. 5, showing a modification of a partial gear.

FIG. 11 is shows a modification of the partial gear 20. As is seen from this drawing, in a radially inside area of the partial gear 20 at portions located between given ones 20c (viz., three hatched teeth) of the teeth 20b, there are formed mechanically weak holding portions N (hatched portions). Due to presence of such mechanically weak holding portions, a detent feeling or shock is produced when, by rotating this partial gear 20 meshed with the toothed portion 17 formed on the door proper 12, the door proper 12 is moved varying the engaging condition between the partial gear 20 the toothed portion 17. Due to production of such detent feeling, an operator who manually handles the door can sense the position taken by the door.

That is, for achieving the ventilation mode, the dual level mode, the defroster mode, the foot mode or the ventilation-foot mode is set, the partial gear 20 is rotated by a certain degree for moving the door proper 12 to the corresponding position. During this, the operator can sense a detent shock when the meshed point between the partial gear 20 and the toothed portion 17 of the door proper 12 changes from a position where the given tooth 20c engages with the toothed portion 17 to another position where the other teeth 20b engage with the toothed portion 17. The detent shock is transmitted to the operator through the rotation shaft 21 of the partial gear 20. With this detent shock, controllability and operability of the device are improved.

For producing the detent feeling, other measures may be employed besides the mechanically weak portions in the partial gear. For example, a partial gear 20 may be used which comprises a base portion constructed of a hard plastic such as ABS or the like and mechanically weak portions constructed of a soft plastic such as polyacetal or the like. That is, in this modification, the difference in material makes the detent feeling.

Embodiment-3

Figure 12:
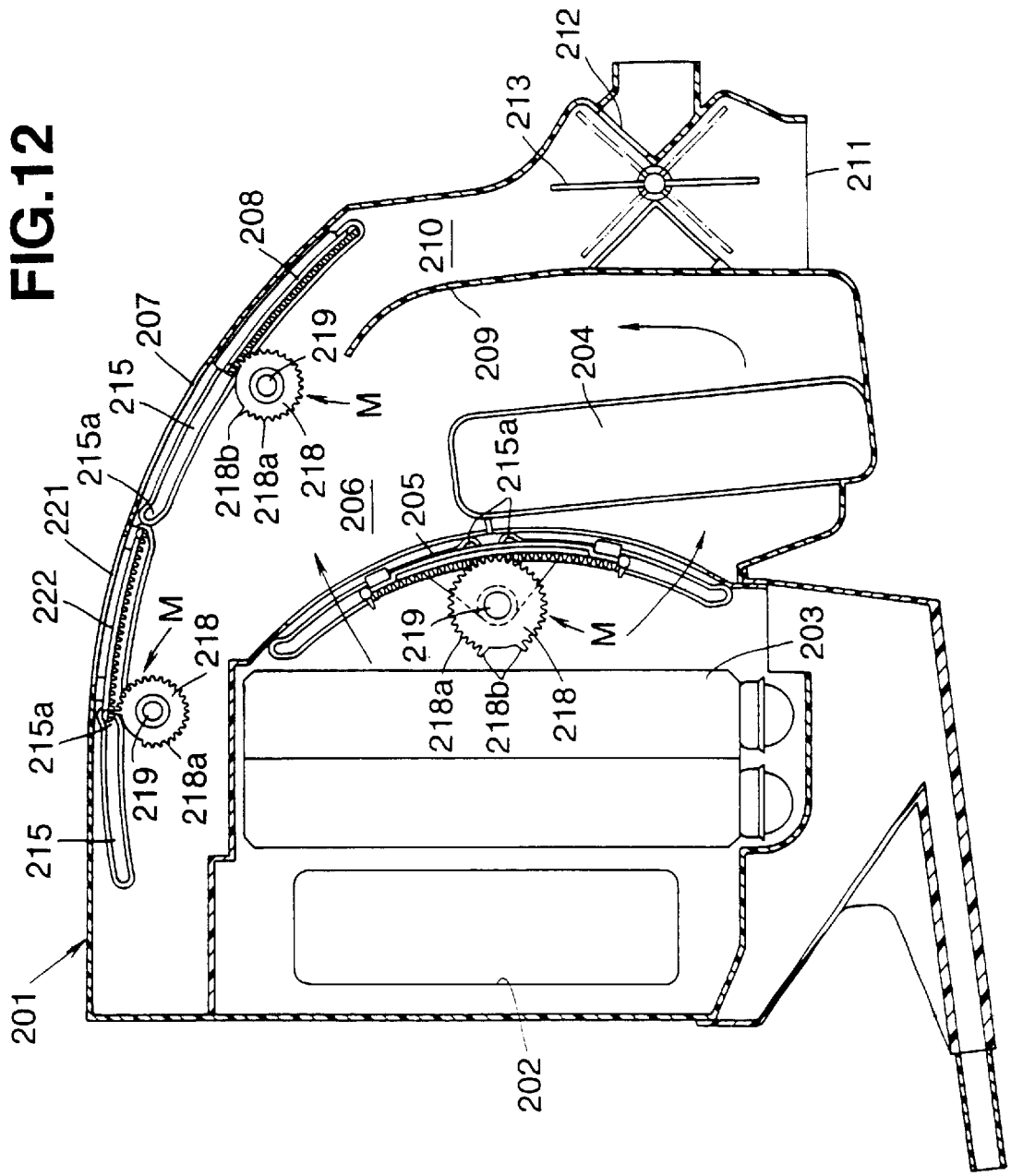
FIG. 12 is a sectional view showing a third embodiment of the present invention.
Figure 13:
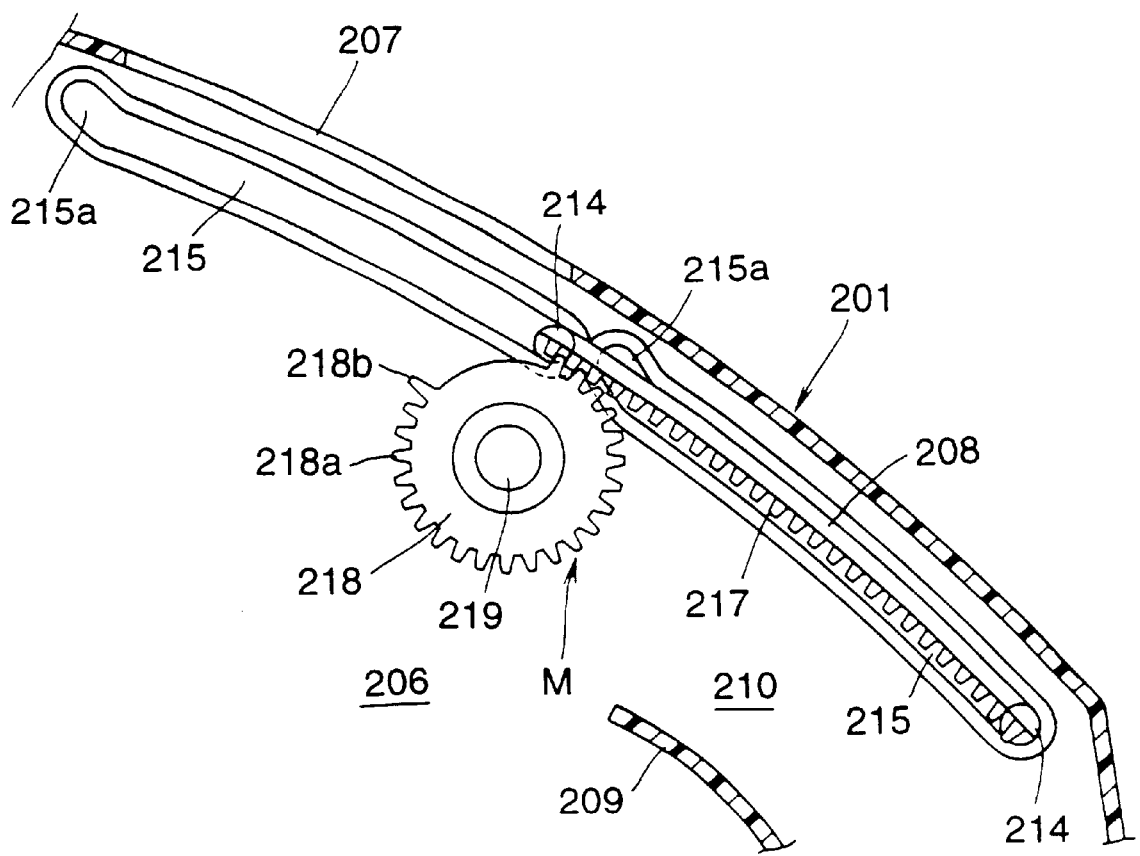
FIG. 13 is an enlarged view of a ventilation opening employed in the third embodiment.

In FIGS. 12 and 13, denoted by numeral 201 is a case of an air conditioner unit. Within the case 201, there are installed an evaporator 203 and a heater core 204 which are aligned so that the air led into the case 201 from a blower unit (not shown) through a blower connecting opening 202 can flow through the evaporator and the heater core in order.

Between the evaporator 203 and the heater core 204, there is arranged an air mix door 205 which can pivot downward for leading the cooled air from the evaporator 203 toward a passage of the heater core 204, pivot upward for leading the cooled air toward a bypass passage bypassing the heater core 204 and/or pivot to a position to lead the cooled air to both the two passages at a given distribution ratio. Above the heater core 204, there is defined a mixing chamber 206 in which the cooled air from the evaporator 203 and the warmed air from the heater core 204 are mixed.

In an upper wall of the case 201 above the mixing chamber 206, there is formed a ventilation opening 207 which is selectively opened and closed by a ventilation door 208, and at a rear side of the mixing chamber 206, there is formed a foot passage 210 defined by a partition wall 209.

The foot passage 210 extends vertically in the case 201 and has at a lower end a foot opening 211 and has an upper portion connected to the mixing chamber 206 at a position near the ventilation opening 207.

In the illustrated embodiment, a rear ventilation opening 212 is formed in a lower rear wall of the foot passage 210 at a position near the foot opening 211, and a mode door 213 is arranged to switch the air flow toward the foot opening 211 or the rear ventilation opening 212.

The ventilation door 208 is of a slide type, which, with the aid of a mechanism identical to the above-mentioned sliding mechanism M of FIGS. 3 to 6, can slide on and along the upper wall of the case 201 between a close position wherein the door closes the ventilation opening 207 and an open position wherein the door opens the ventilation opening 207.

The arrangement of the ventilation door 208 is so made that when the door is in a rest (retracted) position, it does not interfere with the foot passage 210.

In the illustrated embodiment, the ventilation door 208 can be slid from the close position for closing the ventilation opening 207 to the rest (retracted) position which is located at a rear portion of the case 201 near the foot passage 210. That is, when the ventilation door 208 is moved to the rest (retracted) position to fully open the ventilation opening, a rear end of the ventilation door 208 projects or protrudes slightly into a connecting portion between an upper portion of the foot passage 210 and the mixing chamber 206.

In other words, since an upper edge of the partition wall 209 defines the connecting portion between the foot passage 210 and the mixing chamber 206, locating the upper edge of the partition wall 209 near a rear end of the ventilation door 208 in the full open position automatically determines the rest (or retracted) position of the ventilation door 208.

The ventilation door 208 is curved in accordance with a curved contour possessed by the upper wall of the case 201. To front both sides and rear both sides of the ventilation door 208, there are fixed guide pins 214 which may be replaced with guide rollers.

On each inner side wall of the case 201, there are formed front and rear cam grooves 215 with which the front and rear guide pins 214 are slidably engaged to guide the sliding movement of the ventilation door 208 between the full close position and the rest (or retracted) position.

These cam grooves 215 are shaped arcuate in accordance with the curved shape of the upper wall of the case 201, so that the ventilation door 208 can slide along the curved surface of the upper wall of the case 201. A terminal end 215a of each cam groove 215 by which the close position of the ventilation door 208 is determined is bent toward the upper wall of the case 201. Thus, when the guide pin 214 is brought to the terminal end 215a, the ventilation door 208 taking the close position is shifted toward the upper wall of the case 201.

The ventilation door 208 has on its peripheral upper portion a sealing member 216 bonded thereto. Thus, when the ventilation door 208 taking the close position is shifted toward the upper wall of the case 201, the seal member 216 is pressed against the peripheral portion of the ventilation opening 207 to achieve a sealing therebetween.

The ventilation door 208 is formed at both sides of its back surface with toothed portions 217. A drive shaft 219 is rotatably held, which extends between opposed walls of the case 201, and drive gears 218 meshed with the toothed portions 217 are fixed to the drive shaft 219 to rotate therewith.

The drive gears 218 are rotated in both directions by a speed reduction gear mechanism 220 which is connected to an end of the drive shaft 219 projected from the case 201. The toothed portion 218a of each drive gear 218 comprises higher teeth 218b which, when the ventilation door 208 assumes the close position, press the ventilation door 208 toward the upper wall portion of the case 201.

In the illustrated embodiment, in the upper wall of the case 201 at a position near and in front of the ventilation opening 207, there is formed a defroster opening 221 which is opened and closed by a defroster door 222.

Similar to the above-mentioned ventilation door 208, with the aid of a slide mechanism M, the defroster door 222 is slid on and along the upper inside wall of the case 201 between a close position and a rest (retracted) position.

Accordingly, detailed explanation on the construction of the slide door which constitutes the defroster door 222 and that of the slide mechanism M will be omitted. However, when the defroster door 222 is slid forward from the close position to take the rest (retracted) position, the defroster opening 221 is fully opened. The defroster door 222 is arranged in a dead space defined above the evaporator 203 where the air flowing is not interrupted by the defroster door.

In the embodiment, similar to the ventilation door 208 and the defroster door 222, with the aid of a sliding mechanism M, the air mix door 205 is slid upward or downward which is convex in shape. Upper and lower cam grooves 215 constituting the slide mechanism M have respectively upper and lower ends 215a bent rearward. A toothed portion 218a of the drive gear 218 has two higher teeth 218b, so that in the full-hot mode wherein the air mix door 205 fully opens the passage of the heater core 204 and/or in the full-cool mode wherein the bypass passage is fully opened, the air mix door 205 is shifted backward to achieve a sealing at the corresponding opening.

If desired, for independently controlling the temperature of air directed to a driver and that directed to a front seat passenger, the air mix door 205 may comprise a pair of doors, that is, right and left doors which are independently arranged for the driver and the front seat passenger.

In the above-mentioned embodiment, the ventilation door 208 which opens and closes the ventilation opening 207 formed in the upper wall of the case 201 above the mixing chamber 206 is of the slide type which slides on and along the upper inside wall of the case 201 with the aid of the slide mechanism M. Accordingly, unlike a pivotal door type, it does not occur that the ventilation door 208 projects into the mixing chamber 206 when it opens the ventilation opening 207. Thus, the air flow in the mixing chamber 206 is not affected by the ventilation door 208, so that mixing of the cooled air and the warmed air in the mixing chamber 206 is effectively made. Due to the same reason, the air distribution to the ventilation opening 207 is appropriately made. That is, the ventilation door 208 does not cause increase in air flow resistance, and thus the air amount blown out from the ventilation opening 207 is not reduced.

Since the rest position of the ventilation door 208 does not interrupt the air flow toward the foot passage 210, the ventilation door 208 does not interrupt the air flow directed toward the foot passage 210 in the dual level mode wherein the temperature-controlled air is blown from both the ventilation opening 207 and the foot opening 211 and/or in the case wherein the temperature-controlled air is blown from also the rear ventilation opening 212. Accordingly, the amount of air blown from the foot opening 211 and/or the rear ventilation opening 212 is not reduced, so that the air blowing from these openings 211 and 212 is appropriately made.

Furthermore, since the foot passage 210 is defined behind the mixing chamber 206, there is no need of providing a space in which the ventilation door 208 is slid, and thus, the case 201 can have a reduced height and the unit can be made compact in size, which facilitates installing of the device in a vehicle. Furthermore, reduction in number of parts and reduction in cost are achieved.

Especially, in the embodiment, the defroster door 222 which opens and closes the defroster opening 221 formed in the upper wall of the case 201 in front of the ventilation opening 207 is of the slide type which, similar to the ventilation door 208, slides on and over the upper wall of the case 201 with the aid of the sliding mechanism M. Furthermore, the rest position of the defroster door 222 is defined in a dead space above the evaporator where the air flow is not interrupted by the defroster door. Accordingly, the air mixing in the mixing chamber 206 is effectively achieved and the air distribution to the defroster opening 221 is appropriately achieved. Furthermore, since the defroster door 222 does not interrupt the air flow, the amount of air blown from the defroster opening 221 is not reduced.

Furthermore, since the sliding mechanism M for operating the slide door is of a gear type, smoothed operation is achieved and thus the door controllability is improved without suffering from noises.

Furthermore, since the cam groove 215 for guiding the guide pin 214 of the slide door has at its terminal end a portion 215a by which the guide pin 214 is guided in such a direction that the slide door is shifted toward the upper wall side of the case 201, the slide door is pressed against the upper wall of the case 201 when the slide door assumes the close position. Thus, the sealing member 216 on the peripheral edge of the slide door is brought into intimate contact with both the ventilation door 208 and the defroster opening 212 to achieve an assured sealing therebetween thereby suppressing an air leakage therefrom. Thus, the amount of air blown from the selected openings is not reduced and the slide door can be tightly held in the selected position. Thus, the quality and reliability of the device are improved.

Embodiment-4

Figure 14:
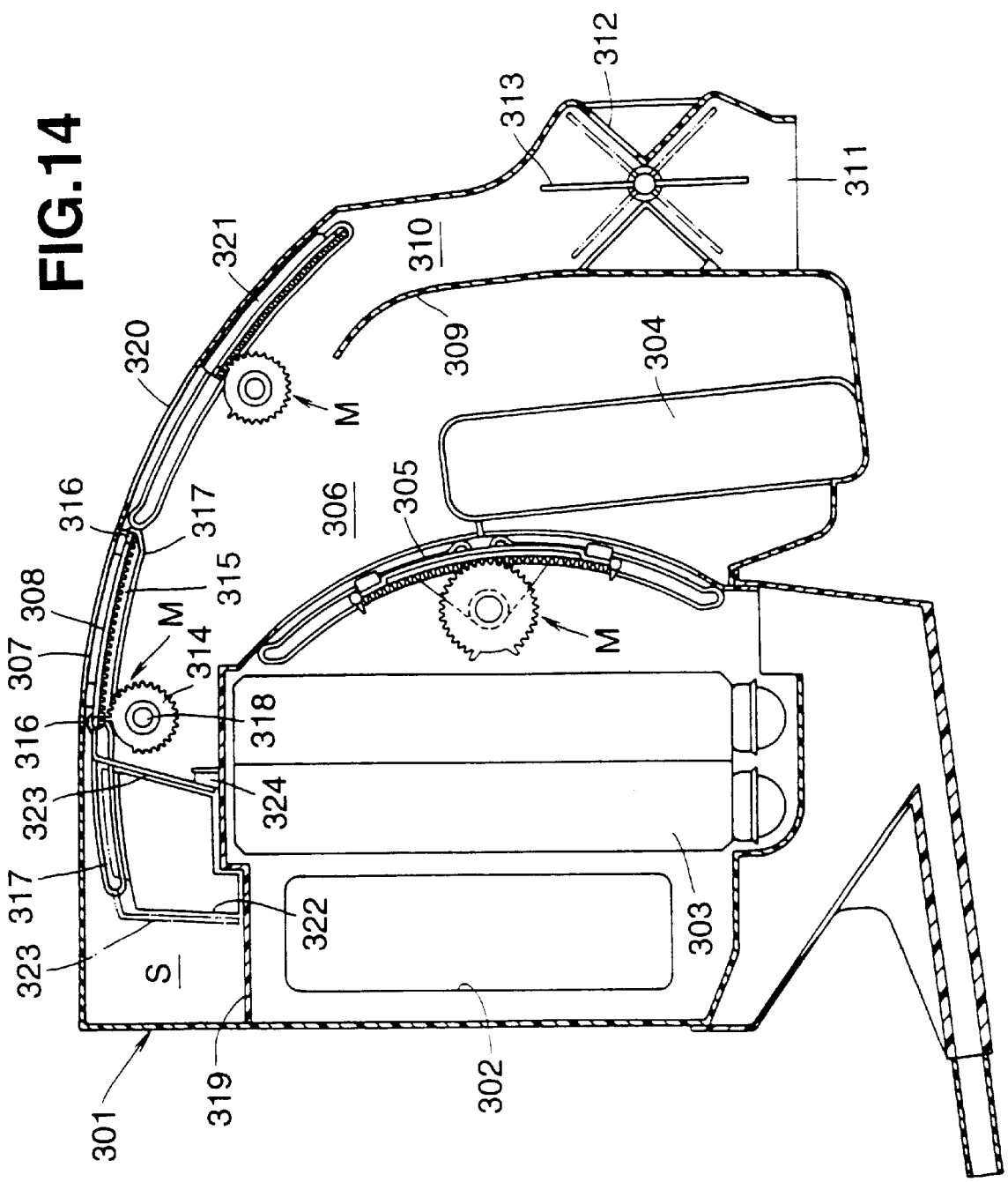
FIG. 14 is a sectional view showing a fourth embodiment of the invention.

In FIG. 14, denoted by numeral 301 is a case of an air conditioning unit. Within the case 301, there are installed an evaporator 303 and a heater core 304 which are aligned so that the air led into the case 301 from a blower unit (not shown) through a blower connecting opening 302 can flow through the evaporator and the heater core in order.

Between the evaporator 303 and the heater core 304, there is arranged an air mix door 305 which can pivot downward for leading the cooled air form the evaporator 303 toward a passage of the heater core 304, pivot upward for leading the cooled air toward a bypass passage bypassing the heater core 204 and/or pivot to a position to lead the cooled air to both the two passages at a given distribution ratio. Above the heater core 305, there is defined a mixing chamber 306 in which the cooled air from the evaporator 303 and the warmed air from the heater core 304 are mixed.

In an upper wall of the case 301 above the mixing chamber 306, there is formed a center ventilation opening 307 which is selectively opened and closed by a ventilation door 308, and at a rear side of the mixing chamber 306, there is formed a foot passage 310 defined by a partition wall 309.

The foot passage 310 extends vertically in the case 301 and has at a lower end a foot opening 311 and has at an upper portion connected to the mixing chamber 306.

In the illustrated embodiment, a rear ventilation opening 312 is formed in a lower rear wall of the foot passage 310 at a position near the foot opening 311, and a mode door 313 is provided which switches the air flow toward the foot opening 311 or the rear ventilation opening 312.

Due to work of a sliding mechanism M which comprises a gear mechanism including a gear 314 and a rack 315 and a guide mechanism including guide pins 316 and guide rails 317, the ventilation door 308 is slid on and along an upper inner wall of the case 301 between a close position to close the center ventilation opening 307 and a rest (or retracted)

position which is located in front of the center ventilation opening 307 and positioned in a dead space defined between a partition wall 319 above the evaporator 303 and the upper wall of the case 301.

The rack 315 and the guide pins 316 are provided by the slide door. The guide rails 317 are provided on both inner surfaces of the case 301. The gear 314 is fixed to a motor-driven shaft 318 which extends across the interior of the case 301.

In the illustrated embodiment, in the upper wall of the case 301 at a position just behind the center ventilation opening 307, there is provided a defroster opening 320 which is selectively opened and closed by a defroster door 321.

Similar to the above-mentioned ventilation door 308, the defroster door 321 is slid on and long the upper inner wall of the case 301 between an open/close position and a rest position due to work of a sliding mechanism M.

The rest position of the defroster door is so determined as not to disturb the air flow toward the foot passage 310 when the defroster door is slid rearward from the close position.

In the illustrated embodiment, similar to the above-mentioned ventilation door 308 and the defroster door 321, the air mix door 305 is slid upward and downward along a curved path due to work of a sliding mechanism M.

In one of upper side walls of the case 301 between which the sliding ventilation door 308 is placed, that is, in one of the side walls of the dead space, there is formed a side ventilation opening 322, and at a front position of the sliding ventilation door 308, there is arranged a sub-door 323 which selectively opens and closes the side ventilation opening 322.

The sub-door 323 is arranged to extend downward at generally right angles from a front end of the ventilation door 308. That is, when the ventilation door 308 takes the close position to close the center ventilation opening 307, the sub-door 323 closes an opening communicated with the mixing chamber 306 in the dead space S, thereby shutting the air flow toward the side ventilation opening 322. When the ventilation door 308 is slid forward to the rest (or retracted) position to fully open the center ventilation opening 307, the sub-door 323 is slid to a front edge of the side ventilation opening 322 to fully open the side ventilation opening 322. That is, in response to the opening/closing condition of the center ventilation opening 307, the side ventilation opening 322 becomes opened and closed.

Denoted by numeral 324 is a door seat portion onto which, upon a full-close condition of the sub-door 323, a peripheral portion of the sub-door 323 is seated to achieve a sealing therebetween.

In the above-mentioned embodiment, for achieving the ventilation mode, the ventilation door 308 is slid forward to the rest (or retracted) position to open the center ventilation opening 307 and the sub-door 323 is slid forward together with the ventilation door 308 to the rest (or retracted) position to open the side ventilation opening 322. Thus, under this mode, the temperature-controlled air in the mixing chamber 306 is led to the vehicle cabin as a center ventilation wind and a side ventilation wind through the center ventilation opening 307 and the side ventilation opening 322.

For achieving a mode other than the ventilation mode and the dual level mode, the ventilation door 308 is slid rearward to the close position to close the center ventilation opening 307 and the sub-door 323 is slid rearward together with the ventilation door 308 to the full-close position to close the side ventilation opening 322, so that the air flow toward the center ventilation opening 307 and that toward the side ventilation opening 322 are shut.

As is described hereinabove, as compared with the center ventilation opening 307 formed in the upper wall of the case 301 above the mixing chamber 306, the side ventilation opening 322 is positioned forward, that is, at a portion of the side wall of the case 301 corresponding to the rest (or retracted) position of the sliding ventilation door 308. With this arrangement, both the center ventilation opening 307 and the side ventilation opening 322 can have sufficiently large open area. Accordingly, the air flow resistance possessed by these openings 307 and 322 can be reduced and thus the mount of air flowing therethrough can be increased.

The sliding ventilation door 308 has at its front end the sub-door 323 which can open and close the side ventilation opening 322 in synchronization with the open/close condition of the center ventilation opening 307. Thus, the temperature-controlled air blown from the center ventilation opening 307 and that from the side ventilation opening 322 can be easily controlled in air distribution.

Embodiment-5

Figure 15:
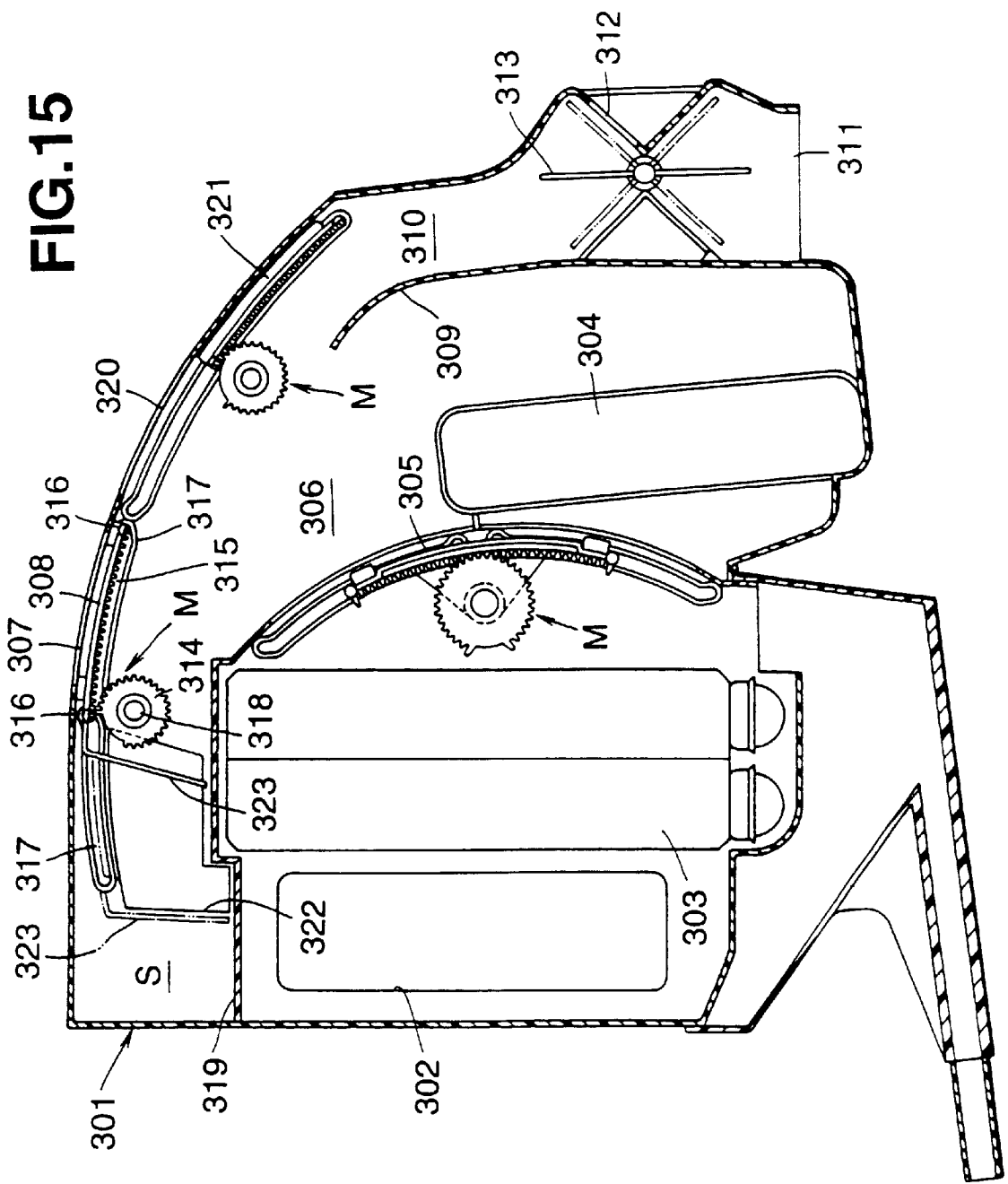
FIG. 15 is a sectional view showing a fifth embodiment of the invention.

FIG. 15 shows the embodiment-5 of the invention. In this embodiment, the side ventilation opening 322 has a rear edge which extends further rearward with respect to the close position of the sub-door 323, so that when the sub-door 323 comes to the close position, the side ventilation opening 322 is still partially opened.

Accordingly, in this embodiment, even in modes other than the ventilation mode and the dual level mode, part of the temperature-controlled air can be constantly led or leaked from the side ventilation opening 322 as a side ventilation wind to achieve defrosting of the door side window. Furthermore, the amount of the leaked air can be easily controlled by the close position of the sub-door 323.

In both the embodiments of FIGS. 14 and 15, the side ventilation opening 322 formed in the side wall of the case 301 is positioned in front of the center ventilation opening 307. Thus, a center ventilation duct (not shown) connected to the center ventilation opening 307 and a side ventilation duct (not shown) connected to the side ventilation opening 322 are prevented from interfering with each other and the layout of these ducts becomes facilitated.

What is claimed is:

1. An automotive air conditioning device comprising:
   a case;
   an evaporator installed in said case for cooling air led into the case;
   a heater core installed in said case at a position downstream of said evaporator;
   a mix door arranged between said evaporator and said heater core to selectively lead the cooled air from said evaporator to one of a passage for said heater core to produce warmed air and a bypass passage bypassing said heater core or lead the cooled air to both the two passages at a predetermined distribution ratio;
   a mixing chamber for collecting and mixing the cooled air and the warmed air, wherein said case having a plurality of walls, a plurality of blowing openings formed in inside walls of said case by which said mixing chamber is defined;
   a plurality of mode doors for selectively opening and closing said blowing openings; and
   a door mechanism of the automotive air conditioning device, said door mechanism comprising:

at least one of the mode doors, the mode door being a sliding type door which, with the aid of a sliding mechanism, slides on and along a given way defined by one of the inside walls to selectively open and close two of said blowing openings, wherein the other of the mode doors is so arranged that even when operated, it does not enter the area of said mixing chamber which is defined by said sliding door and the inside walls, the other of the mode doors being positioned downstream of the sliding type mode door, and positioned in a passage that has at least one wall defined by at least one of the inside walls of said case by which the mixing chamber is defined, and arranged to selectively open and close at least two of said blowing openings; and wherein said sliding mechanism comprises a toothed portion formed on a door proper of said sliding type mode door, a gear meshed with the toothed portion, a driving device connected to said gear, guide members possessed by said door proper, and cam grooves formed in said case for slidably receiving therein said guide members, said cam grooves being constructed and arranged to allow said door proper to slide on and along a curved surface of said one of the inside walls by which said mixing chamber is partially defined.

2. A door mechanism of the automotive air conditioning device as claimed in claim 1, wherein said sliding type mode door has an arcuate cross section.

3. A door mechanism of the automotive air conditioning device as claimed in claim 1, wherein said gear is constructed to produce a detent engagement when rotated while being meshed with said toothed portion of said sliding type mode door.

4. A door mechanism of the automotive air conditioning device as claimed in claim 3, wherein said gear is formed with mechanically weaker holding portions in given portions thereof, said mechanically weaker holding portions extending circumferentially inside the teeth of said gear.

* * * * *